US010419611B2

(12) United States Patent
Conway et al.

(10) Patent No.: US 10,419,611 B2
(45) Date of Patent: Sep. 17, 2019

(54) SYSTEM AND METHODS FOR DETERMINING TRENDS IN ELECTRONIC COMMUNICATIONS

(75) Inventors: Kelly Conway, Lake Bluff, IL (US); Alan Yengoyan, Chicago, IL (US); Douglas Brown, Austin, TX (US); David Gustafson, Lake Forest, IL (US); Christopher Danson, Austin, TX (US)

(73) Assignee: MATTERSIGHT CORPORATION, Chicago, IL (US)

( * ) Notice: Subject to any disclaimer, the term of this patent is extended or adjusted under 35 U.S.C. 154(b) by 992 days.

(21) Appl. No.: 12/286,169

(22) Filed: Sep. 29, 2008

(65) Prior Publication Data
US 2009/0103709 A1    Apr. 23, 2009

Related U.S. Application Data

(60) Provisional application No. 60/976,372, filed on Sep. 28, 2007.

(51) Int. Cl.
*H04M 3/51* (2006.01)
*H04M 3/42* (2006.01)

(52) U.S. Cl.
CPC ..... *H04M 3/5175* (2013.01); *H04M 3/42221* (2013.01)

(58) Field of Classification Search
CPC ....... H04M 3/42221; H04M 2203/401; H04M 2201/40
USPC .................................. 379/256.06; 704/270.1
See application file for complete search history.

(56) References Cited

U.S. PATENT DOCUMENTS

| | | | |
|---|---|---|---|
| 3,851,121 A | 11/1974 | Marvin |
| 3,855,416 A | 12/1974 | Fuller |
| 3,855,418 A | 12/1974 | Fuller |
| 3,971,034 A | 7/1976 | Bell, Jr. et al. |
| 4,093,821 A | 6/1978 | Williamson |
| 4,142,067 A | 2/1979 | Williamson |
| 4,377,158 A | 3/1983 | Friedman et al. |
| 4,490,840 A | 12/1984 | Jones |
| 4,694,483 A | 9/1987 | Cheung |
| 4,811,131 A | 3/1989 | Sander et al. |
| 4,827,461 A | 5/1989 | Sander |
| 4,835,630 A | 5/1989 | Freer |
| 4,851,937 A | 7/1989 | Sander |
| 4,853,952 A | 8/1989 | Jachmann et al. |
| 4,864,432 A | 9/1989 | Freer |
| 4,873,592 A | 10/1989 | Dulaff et al. |
| 4,888,652 A | 12/1989 | Sander |
| 4,891,835 A | 1/1990 | Leung et al. |
| 4,893,197 A | 1/1990 | Howells et al. |

(Continued)

FOREIGN PATENT DOCUMENTS

| | | |
|---|---|---|
| EP | 0862304 A2 | 9/1998 |
| EP | 0863678 A2 | 9/1998 |

(Continued)

*Primary Examiner* — Ahmad F. Matar
*Assistant Examiner* — Jirapon Intavong
(74) *Attorney, Agent, or Firm* — Haynes and Boone, LLP

(57) ABSTRACT

The invention relates to a method and system for analyzing an electronic communication, more particularly, to analyzing telephonic communications between customers and a contact center to determine and display the most relevant communications to an organization or business.

26 Claims, 31 Drawing Sheets

(56) References Cited

U.S. PATENT DOCUMENTS

| | | |
|---|---|---|
| 4,958,367 A | 9/1990 | Freer et al. |
| 5,003,575 A | 3/1991 | Chamberlin et al. |
| 5,008,835 A | 4/1991 | Jachmann et al. |
| 5,148,483 A | 9/1992 | Silverman |
| 5,148,493 A | 9/1992 | Bruney |
| 5,206,903 A | 4/1993 | Kohler et al. |
| 5,216,744 A | 6/1993 | Alleyne et al. |
| 5,239,460 A | 8/1993 | LaRoche |
| 5,274,738 A | 12/1993 | Daly et al. |
| 5,299,260 A | 3/1994 | Shaio |
| 5,339,203 A | 8/1994 | Henits et al. |
| 5,396,371 A | 3/1995 | Henits et al. |
| 5,446,603 A | 8/1995 | Henits et al. |
| 5,448,420 A | 9/1995 | Henits et al. |
| 5,457,782 A | 10/1995 | Daly et al. |
| 5,467,391 A | 11/1995 | Donaghue et al. |
| 5,500,795 A | 3/1996 | Powers et al. |
| 5,535,256 A | 7/1996 | Maloney et al. |
| 5,559,875 A | 9/1996 | Bieselin et al. |
| 5,561,707 A | 10/1996 | Katz |
| 5,577,254 A | 11/1996 | Gilbert |
| 5,590,171 A | 12/1996 | Howe et al. |
| 5,590,188 A | 12/1996 | Crockett |
| 5,594,790 A | 1/1997 | Curren et al. |
| 5,594,791 A | 1/1997 | Szlam et al. |
| 5,621,789 A | 4/1997 | McCalmont et al. |
| 5,633,916 A | 5/1997 | Goldhagen et al. |
| 5,646,981 A | 7/1997 | Klein |
| 5,696,811 A | 12/1997 | Maloney et al. |
| 5,710,884 A | 1/1998 | Dedrick |
| 5,712,954 A | 1/1998 | Dezonno |
| 5,717,742 A | 2/1998 | Hyde-Thomson |
| 5,721,827 A | 2/1998 | Logan et al. |
| 5,724,420 A | 3/1998 | Torgrim |
| 5,732,216 A | 3/1998 | Logan et al. |
| 5,734,890 A | 3/1998 | Case et al. |
| 5,737,405 A | 4/1998 | Dezonno |
| 5,757,904 A | 5/1998 | Anderson |
| 5,764,728 A | 6/1998 | Ala et al. |
| 5,768,513 A | 6/1998 | Kuthyar et al. |
| 5,784,452 A | 6/1998 | Carney |
| 5,790,798 A | 8/1998 | Beckett, II et al. |
| 5,799,063 A | 8/1998 | Krane |
| 5,809,250 A | 9/1998 | Kisor |
| 5,815,551 A | 9/1998 | Katz |
| 5,818,907 A | 10/1998 | Maloney et al. |
| 5,818,909 A | 10/1998 | Van Berkum et al. |
| 5,819,005 A | 10/1998 | Daly et al. |
| 5,822,306 A | 10/1998 | Catchpole |
| 5,822,400 A | 10/1998 | Smith |
| 5,822,410 A | 10/1998 | McCausland et al. |
| 5,822,744 A | 10/1998 | Kesel |
| 5,825,869 A | 10/1998 | Brooks et al. |
| 5,828,730 A | 10/1998 | Zebryk et al. |
| 5,841,966 A | 11/1998 | Irribarren |
| 5,845,290 A | 12/1998 | Yoshii |
| 5,848,396 A | 12/1998 | Gerace |
| 5,854,832 A | 12/1998 | Dezonno |
| 5,857,175 A | 1/1999 | Day et al. |
| 5,859,898 A | 1/1999 | Checco |
| 5,864,616 A | 1/1999 | Hartmeier |
| 5,870,549 A | 2/1999 | Bobo, II |
| 5,875,436 A | 2/1999 | Kikinis |
| 5,878,384 A | 3/1999 | Johnson et al. |
| 5,884,032 A | 3/1999 | Bateman et al. |
| 5,884,262 A | 3/1999 | Wise et al. |
| 5,894,512 A | 4/1999 | Zenner |
| 5,897,616 A | 4/1999 | Kanevsky et al. |
| 5,903,641 A | 5/1999 | Tonisson |
| 5,910,107 A | 6/1999 | Iliff |
| 5,911,776 A | 6/1999 | Guck |
| 5,914,951 A | 6/1999 | Bentley et al. |
| 5,915,001 A | 6/1999 | Uppaluru |
| 5,915,011 A | 6/1999 | Miloslavsky |
| 5,923,746 A | 7/1999 | Baker |
| 5,926,538 A | 7/1999 | Deryugen |
| 5,930,764 A | 7/1999 | Melchione et al. |
| 5,937,029 A | 8/1999 | Yosef |
| 5,940,476 A | 8/1999 | Morganstein et al. |
| 5,940,494 A | 8/1999 | Rafacz |
| 5,940,792 A | 8/1999 | Hollier |
| 5,943,416 A | 8/1999 | Gisby |
| 5,945,989 A | 8/1999 | Freishtat |
| 5,946,375 A | 8/1999 | Pattison et al. |
| 5,946,388 A | 8/1999 | Walker et al. |
| 5,951,643 A | 9/1999 | Shelton et al. |
| 5,953,389 A | 9/1999 | Pruett |
| 5,953,406 A | 9/1999 | LaRue et al. |
| 5,964,839 A | 10/1999 | Johnson et al. |
| 5,978,465 A | 11/1999 | Corduroy et al. |
| 5,987,415 A * | 11/1999 | Breese et al. ............... 704/270 |
| 5,991,735 A | 11/1999 | Gerace |
| 6,003,013 A | 12/1999 | Boushy et al. |
| 6,006,188 A | 12/1999 | Bogdashevsky et al. |
| 6,009,163 A | 12/1999 | Nabkel et al. |
| 6,014,647 A | 1/2000 | Nizzari et al. |
| 6,021,428 A | 2/2000 | Miloslavsky |
| 6,026,397 A | 2/2000 | Sheppard |
| 6,029,153 A | 2/2000 | Bauchner et al. |
| 6,058,163 A | 5/2000 | Pattison et al. |
| 6,064,731 A | 5/2000 | Flockhart et al. |
| 6,078,891 A | 6/2000 | Riordan |
| 6,108,711 A | 8/2000 | Beck et al. |
| 6,128,380 A | 10/2000 | Shaffer et al. |
| 6,151,571 A | 11/2000 | Pertrushin |
| 6,173,053 B1 | 1/2001 | Bogart et al. |
| 6,185,534 B1 | 2/2001 | Breese et al. |
| 6,195,426 B1 | 2/2001 | Bolduc et al. |
| 6,205,215 B1 | 3/2001 | Dombakly |
| 6,212,502 B1 * | 4/2001 | Ball ........................ G10L 17/26 704/270 |
| 6,243,684 B1 | 6/2001 | Stuart et al. |
| 6,246,752 B1 | 6/2001 | Bscheider et al. |
| 6,249,570 B1 | 6/2001 | Glowny et al. |
| 6,252,946 B1 | 6/2001 | Glowny et al. |
| 6,252,947 B1 | 6/2001 | Diamond et al. |
| 6,275,806 B1 | 8/2001 | Pertrushin |
| 6,286,030 B1 | 9/2001 | Wenig et al. |
| 6,289,094 B1 | 9/2001 | Miloslavsky |
| 6,295,353 B1 | 9/2001 | Flockhart et al. |
| 6,330,025 B1 | 12/2001 | Arazi et al. |
| 6,334,110 B1 | 12/2001 | Walter et al. |
| 6,345,094 B1 | 2/2002 | Khan et al. |
| 6,353,810 B1 | 3/2002 | Petrushin |
| 6,363,145 B1 | 3/2002 | Shaffer et al. |
| 6,363,346 B1 | 3/2002 | Walters |
| 6,366,658 B1 | 4/2002 | Bjornberg et al. |
| 6,366,666 B2 | 4/2002 | Bengtson et al. |
| 6,370,574 B1 | 4/2002 | House et al. |
| 6,389,132 B1 | 5/2002 | Price |
| 6,392,666 B1 | 5/2002 | Hong et al. |
| 6,404,857 B1 | 6/2002 | Blair et al. |
| 6,404,883 B1 | 6/2002 | Hartmeier |
| 6,411,687 B1 | 6/2002 | Bohacek et al. |
| 6,411,708 B1 | 6/2002 | Khan |
| 6,424,709 B1 | 7/2002 | Doyle et al. |
| 6,434,230 B1 | 8/2002 | Gabriel |
| 6,434,231 B2 | 8/2002 | Neyman et al. |
| 6,446,119 B1 | 9/2002 | Olah et al. |
| 6,466,663 B1 | 10/2002 | Ravenscroft et al. |
| 6,480,601 B1 | 11/2002 | McLaughlin |
| 6,480,826 B2 | 11/2002 | Pertrushin |
| 6,490,560 B1 | 12/2002 | Ramaswamy et al. |
| 6,510,220 B1 | 1/2003 | Beckett et al. |
| 6,535,601 B1 | 3/2003 | Flockhart et al. |
| 6,542,156 B1 | 4/2003 | Hong et al. |
| 6,542,602 B1 | 4/2003 | Elazar |
| 6,553,112 B2 | 4/2003 | Ishikawa |
| 6,556,976 B1 | 4/2003 | Callen |
| 6,567,504 B1 | 5/2003 | Kercheval et al. |
| 6,567,787 B1 | 5/2003 | Walker et al. |
| 6,574,605 B1 | 6/2003 | Sanders et al. |
| 6,598,020 B1 | 7/2003 | Kleindienst et al. |
| 6,600,821 B1 | 7/2003 | Chan et al. |

(56) References Cited

U.S. PATENT DOCUMENTS

| | | |
|---|---|---|
| 6,601,031 B1 | 7/2003 | O'Brien |
| 6,611,498 B1 | 8/2003 | Baker et al. |
| 6,628,777 B1 | 9/2003 | McIllwaine et al. |
| 6,643,622 B2 | 11/2003 | Stuart et al. |
| 6,647,372 B1 | 11/2003 | Brady et al. |
| 6,658,388 B1 | 12/2003 | Kleindienst et al. |
| 6,658,391 B1 | 12/2003 | Williams et al. |
| 6,662,156 B2 | 12/2003 | Bartosik |
| 6,665,644 B1 | 12/2003 | Kanevsky et al. |
| 6,674,447 B1 | 1/2004 | Chiang et al. |
| 6,691,073 B1 | 2/2004 | Erten et al. |
| 6,700,972 B1 | 3/2004 | McGugh et al. |
| 6,721,417 B2 | 4/2004 | Saito et al. |
| 6,721,704 B1 | 4/2004 | Strubbe et al. |
| 6,724,887 B1 * | 4/2004 | Eilbacher ............ H04M 3/5183 379/265.02 |
| 6,728,345 B2 | 4/2004 | Glowny et al. |
| 6,731,307 B1 | 5/2004 | Strubbe et al. |
| 6,731,744 B1 | 5/2004 | Khuc et al. |
| 6,735,298 B2 | 5/2004 | Neyman et al. |
| 6,741,697 B2 | 5/2004 | Benson et al. |
| 6,744,877 B1 | 6/2004 | Edwards |
| 6,751,297 B2 | 6/2004 | Nelkenbaum |
| 6,757,361 B2 | 6/2004 | Blair et al. |
| 6,760,414 B1 | 7/2004 | Schurko et al. |
| 6,760,727 B1 | 7/2004 | Schroeder et al. |
| 6,766,012 B1 | 7/2004 | Crossley |
| 6,775,372 B1 | 8/2004 | Henits |
| 6,782,093 B2 | 8/2004 | Uckun |
| 6,785,369 B2 | 8/2004 | Diamond et al. |
| 6,785,370 B2 | 8/2004 | Glowny et al. |
| 6,788,768 B1 | 9/2004 | Saylor et al. |
| 6,798,876 B1 | 9/2004 | Bala |
| 6,839,671 B2 | 1/2005 | Attwater et al. |
| 6,842,405 B1 | 1/2005 | D'Agosto, III |
| 6,853,966 B2 | 2/2005 | Bushey et al. |
| 6,864,901 B2 | 3/2005 | Chang et al. |
| 6,865,604 B2 | 3/2005 | Nisani et al. |
| 6,868,392 B1 | 3/2005 | Ogasawara |
| 6,870,920 B2 | 3/2005 | Henits |
| 6,871,229 B2 | 3/2005 | Nisani et al. |
| 6,880,004 B2 | 4/2005 | Nisani et al. |
| 6,937,706 B2 | 8/2005 | Bscheider et al. |
| 6,959,078 B1 | 10/2005 | Eilbacher et al. |
| 6,959,079 B2 | 10/2005 | Elazar |
| 7,010,106 B2 | 3/2006 | Gritzer et al. |
| 7,010,109 B2 | 3/2006 | Gritzer et al. |
| 7,027,708 B2 | 4/2006 | Nygren et al. |
| 7,043,745 B2 | 5/2006 | Nygren et al. |
| 7,149,788 B1 | 12/2006 | Gundla et al. |
| 7,203,285 B2 | 4/2007 | Blair |
| 7,216,162 B2 | 5/2007 | Amit et al. |
| 7,219,138 B2 | 5/2007 | Straut et al. |
| 7,305,082 B2 | 12/2007 | Elazar et al. |
| 7,333,445 B2 | 2/2008 | Ilan et al. |
| 7,346,186 B2 | 3/2008 | Sharoni et al. |
| 7,376,735 B2 | 5/2008 | Straut et al. |
| 7,664,641 B1 * | 2/2010 | Pettay et al. .................. 704/251 |
| 2001/0043685 A1 | 11/2001 | Bscheider et al. |
| 2002/0002460 A1 | 1/2002 | Pertrushin |
| 2002/0002464 A1 * | 1/2002 | Petrushin ............... G10L 17/26 704/275 |
| 2002/0010587 A1 | 1/2002 | Pertrushin |
| 2002/0110264 A1 | 8/2002 | Sharoni et al. |
| 2002/0111811 A1 | 8/2002 | Bares et al. |
| 2002/0133394 A1 | 9/2002 | Bushey et al. |
| 2002/0143599 A1 | 10/2002 | Nourbakhsh et al. |
| 2002/0194002 A1 | 12/2002 | Petrushin |
| 2003/0033145 A1 | 2/2003 | Petrushin |
| 2003/0033152 A1 | 2/2003 | Cameron |
| 2003/0069780 A1 | 4/2003 | Hailwood et al. |
| 2003/0072463 A1 | 4/2003 | Chen |
| 2003/0142122 A1 | 7/2003 | Straut et al. |
| 2003/0144900 A1 | 7/2003 | Whitmer |
| 2003/0145140 A1 | 7/2003 | Straut et al. |
| 2003/0154092 A1 | 8/2003 | Bouron et al. |
| 2004/0041830 A1 | 3/2004 | Chiang et al. |
| 2004/0054715 A1 | 3/2004 | Cesario |
| 2004/0073569 A1 | 4/2004 | Knott et al. |
| 2004/0100507 A1 | 5/2004 | Hayner et al. |
| 2004/0101127 A1 | 5/2004 | Dezonno et al. |
| 2004/0103409 A1 | 5/2004 | Hayner et al. |
| 2004/0117185 A1 * | 6/2004 | Scarano et al. ................ 704/254 |
| 2004/0158869 A1 | 8/2004 | Safran et al. |
| 2004/0162724 A1 | 8/2004 | Hill et al. |
| 2004/0181376 A1 | 9/2004 | Fables et al. |
| 2004/0190687 A1 | 9/2004 | Baker |
| 2004/0249636 A1 | 12/2004 | Applebaum |
| 2004/0249650 A1 | 12/2004 | Freedman et al. |
| 2004/0264652 A1 | 12/2004 | Erhart et al. |
| 2005/0010411 A1 | 1/2005 | Rigazio et al. |
| 2005/0010415 A1 | 1/2005 | Hagen et al. |
| 2005/0010598 A1 * | 1/2005 | Shankar .................. G06Q 10/06 |
| 2005/0018622 A1 | 1/2005 | Halbraich et al. |
| 2005/0108383 A1 | 5/2005 | DeHaas et al. |
| 2005/0108775 A1 | 5/2005 | Bachar et al. |
| 2005/0123115 A1 | 6/2005 | Gritzer et al. |
| 2005/0204378 A1 | 9/2005 | Gabay |
| 2005/0240656 A1 | 10/2005 | Blair |
| 2006/0028488 A1 | 2/2006 | Gabay et al. |
| 2006/0045185 A1 | 3/2006 | Kiryati et al. |
| 2006/0074898 A1 | 4/2006 | Gavalda et al. |
| 2006/0089837 A1 | 4/2006 | Adar et al. |
| 2006/0106670 A1 * | 5/2006 | Cai et al. ......................... 705/13 |
| 2006/0111904 A1 | 5/2006 | Wasserblat et al. |
| 2006/0123106 A1 | 6/2006 | Blair et al. |
| 2006/0126817 A1 | 6/2006 | Beckett, II et al. |
| 2006/0133624 A1 | 6/2006 | Waserblat et al. |
| 2006/0150229 A1 | 7/2006 | Blair et al. |
| 2006/0168188 A1 | 7/2006 | Dutton |
| 2006/0200520 A1 | 9/2006 | Vernon et al. |
| 2006/0200832 A1 | 9/2006 | Dutton |
| 2006/0212295 A1 | 9/2006 | Wasserblat et al. |
| 2006/0227719 A1 | 10/2006 | Halbraich |
| 2006/0262920 A1 * | 11/2006 | Conway ............... G10L 15/1822 379/265.02 |
| 2006/0262922 A1 * | 11/2006 | Margulies ............... G06Q 30/02 379/265.12 |
| 2006/0268847 A1 | 11/2006 | Halbraich et al. |
| 2006/0285665 A1 | 12/2006 | Wasserblat et al. |
| 2007/0019634 A1 | 1/2007 | Fisher et al. |
| 2007/0083540 A1 | 4/2007 | Gundla et al. |
| 2007/0094408 A1 | 4/2007 | Gundla et al. |
| 2007/0106791 A1 | 5/2007 | Blumenau |
| 2007/0106792 A1 | 5/2007 | Blumenau |
| 2007/0121824 A1 * | 5/2007 | Agapi .................. H04M 3/5175 379/88.18 |
| 2007/0127693 A1 * | 6/2007 | D'Ambrosio et al. .. 379/265.06 |
| 2007/0160189 A1 | 7/2007 | Blair |
| 2007/0160190 A1 | 7/2007 | Blair |
| 2007/0160191 A1 | 7/2007 | Blair |
| 2007/0195944 A1 | 8/2007 | Korenblit et al. |
| 2007/0195945 A1 | 8/2007 | Korenblit et al. |
| 2007/0198284 A1 | 8/2007 | Korenblit et al. |
| 2007/0198322 A1 | 8/2007 | Bourne et al. |
| 2007/0198323 A1 | 8/2007 | Bourne et al. |
| 2007/0198325 A1 | 8/2007 | Lyerly et al. |
| 2007/0198329 A1 | 8/2007 | Lyerly et al. |
| 2007/0198330 A1 | 8/2007 | Korenblit et al. |
| 2007/0206764 A1 | 9/2007 | Keren et al. |
| 2007/0206766 A1 | 9/2007 | Keren et al. |
| 2007/0206767 A1 | 9/2007 | Keren et al. |
| 2007/0206768 A1 | 9/2007 | Bourne et al. |
| 2007/0217576 A1 | 9/2007 | Blair |
| 2007/0230345 A1 | 10/2007 | Spohrer et al. |
| 2007/0230444 A1 | 10/2007 | Williams et al. |
| 2007/0230446 A1 | 10/2007 | Williams et al. |
| 2007/0230478 A1 | 10/2007 | Dong et al. |
| 2007/0237525 A1 | 10/2007 | Spohrer et al. |
| 2007/0250318 A1 | 10/2007 | Waserblat et al. |
| 2007/0258434 A1 | 11/2007 | Williams et al. |
| 2007/0263785 A1 | 11/2007 | Williams et al. |
| 2007/0263786 A1 | 11/2007 | Dong et al. |
| 2007/0263787 A1 | 11/2007 | Dong et al. |

(56) References Cited

U.S. PATENT DOCUMENTS

| | | |
|---|---|---|
| 2007/0263788 A1 | 11/2007 | Spohrer et al. |
| 2007/0274505 A1 | 11/2007 | Gupta et al. |
| 2007/0282807 A1 | 12/2007 | Ringelman et al. |
| 2007/0297578 A1 | 12/2007 | Blair et al. |
| 2008/0002719 A1 | 1/2008 | Byrd et al. |
| 2008/0002823 A1 | 1/2008 | Fama et al. |
| 2008/0004945 A1 | 1/2008 | Watson et al. |
| 2008/0005307 A1 | 1/2008 | Byrd et al. |
| 2008/0005318 A1 | 1/2008 | Dong et al. |
| 2008/0005568 A1 | 1/2008 | Watson et al. |
| 2008/0005569 A1 | 1/2008 | Watson et al. |
| 2008/0005588 A1 | 1/2008 | Watson et al. |
| 2008/0040110 A1 | 2/2008 | Pereg et al. |
| 2008/0052535 A1 | 2/2008 | Spohrer et al. |
| 2008/0065902 A1 | 3/2008 | Spohrer et al. |
| 2008/0080385 A1 * | 4/2008 | Blair ............... 370/252 |
| 2008/0080386 A1 | 4/2008 | Calahan et al. |
| 2008/0080481 A1 | 4/2008 | Calahan et al. |
| 2008/0080482 A1 | 4/2008 | Calahan et al. |
| 2008/0080483 A1 | 4/2008 | Calahan et al. |
| 2008/0080531 A1 | 4/2008 | Williams et al. |
| 2008/0080685 A1 | 4/2008 | Barnes et al. |
| 2008/0080698 A1 | 4/2008 | Williams et al. |
| 2008/0082329 A1 | 4/2008 | Watson |
| 2008/0082330 A1 | 4/2008 | Blair |
| 2008/0082336 A1 | 4/2008 | Duke et al. |
| 2008/0082340 A1 | 4/2008 | Blair et al. |
| 2008/0082341 A1 | 4/2008 | Blair |
| 2008/0082502 A1 | 4/2008 | Gupta |
| 2008/0082669 A1 | 4/2008 | Williams et al. |
| 2008/0152122 A1 * | 6/2008 | Idan ............... H04M 3/5175 379/265.07 |

FOREIGN PATENT DOCUMENTS

| | | |
|---|---|---|
| EP | 0998108 A1 | 5/2000 |
| EP | 1361739 A1 | 11/2003 |
| EP | 1377907 A2 | 1/2004 |
| EP | 1635534 A2 | 3/2006 |
| GB | 2331201 A | 5/1999 |
| GB | 2389736 A | 12/2003 |
| WO | WO 2001074042 A2 | 10/2001 |
| WO | WO 2002017165 A2 | 2/2002 |
| WO | WO 2002073413 A2 | 9/2002 |
| WO | WO 2003001809 A1 | 1/2003 |
| WO | WO 2003009175 A1 | 1/2003 |
| WO | WO 2006124942 A1 | 11/2006 |
| WO | WO 2006124945 A1 | 11/2006 |
| WO | WO 2006125047 A1 | 11/2006 |
| WO | WO 2007100345 A1 | 9/2007 |
| WO | WO 2007106113 A2 | 9/2007 |

* cited by examiner

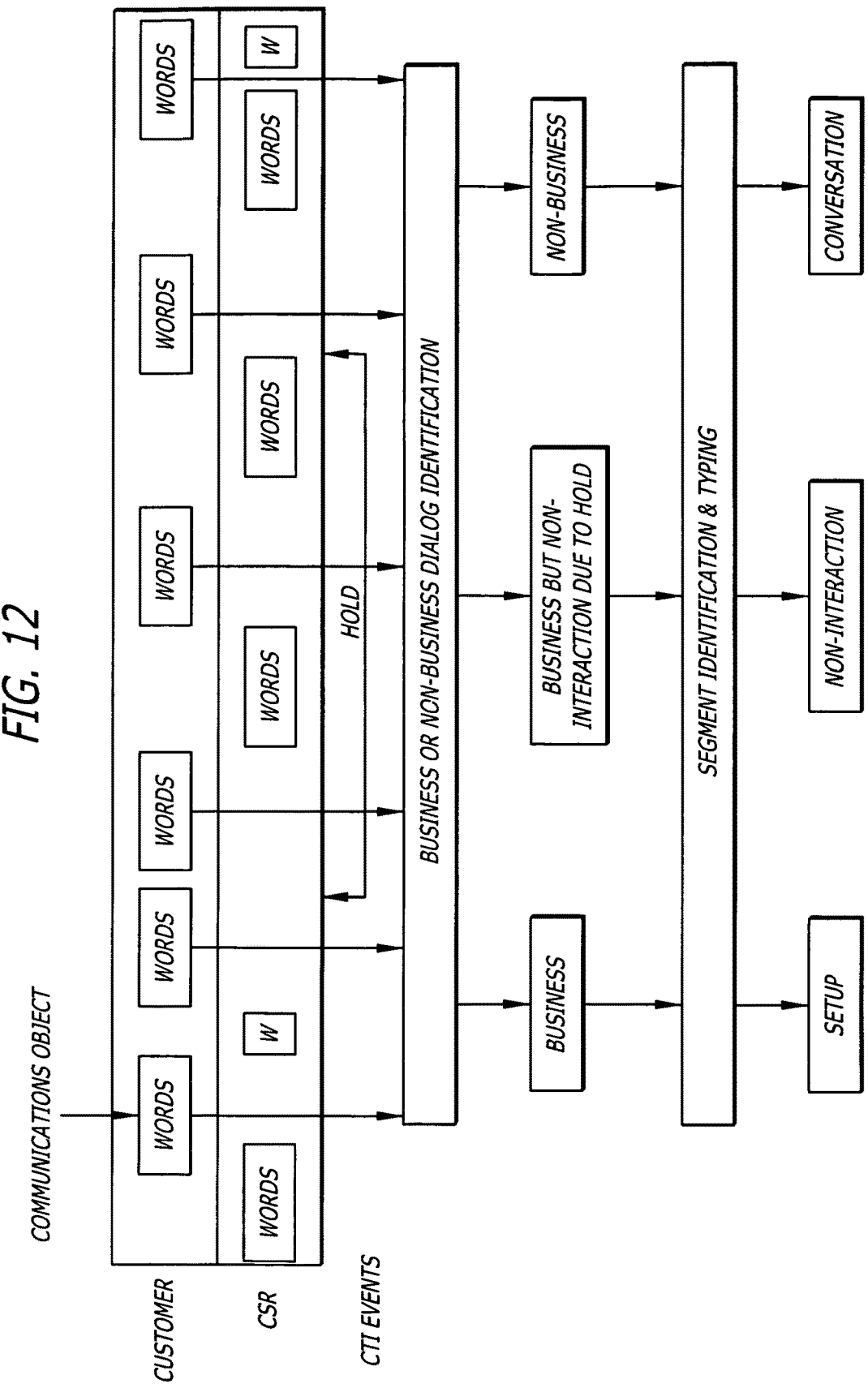

FIG. 13

| SEGMENT DATA ELEMENT | DESCRIPTION | SUB DESCRIPTION |
|---|---|---|
| SEGMENT NUMBER | CUSTOMER CONVERSATION SEQUENCE NUMBER | |
| SEGMENT DURATION | DURATION IN SECONDS | |
| SEGMENT TYPE | CONVERSATION TYPE | SET UP; INFORMATION EXCHANGE; MISCOMMUNICATION; CONVERSATION; POSITIVE COMMENT; NON-INTERACTION |
| SEGMENT VECTOR | EMOTIONAL DIRECTION | +/0/- |
| SEGMENT TOPIC | THE PRIMARY TOPIC OF THE SEGMENT | SET UP; BUSINESS ISSUE; BACKGROUND; FEELING STATE |
| SEGMENT PERSONALITY | PRIMARY PERSONALITY OF THE SEGMENT | INFORMATION EXCHANGE OR; EMOTIONS; THOUGHTS; REACTIONS; OPINIONS; REFLECTIONS; ACTIONS; OR POSITIVE AFFIRMATION |
| DESKTOP USAGE | DESKTOP USAGE TYPE | INFORMATION EXCHANGE; OTHER OR IDLE |
| | | OTHER: DEFINE NON-APPROVED APPLICATION CLASSIFICATION |

FIG. 14

| SEGMENT TYPE | DESCRIPTION | SEGMENT VECTOR | ISSUE |
|---|---|---|---|
| SET UP | GIVING ACCOUNT SET UP/VERIFICATION INFORMATION | 0 | SET UP INFORMATION |
| INFORMATION EXCHANGE | PROVIDING INFORMATION OF THE CALL ISSUE | 0 | CALL TYPE SUB TOPIC OR BACKGROUND INFORMATION |
| MISCOMMUNICATION | CUSTOMER DISTRESS | - | CALL TYPE SUB TOPIC AND/OR NEGATIVE FEELING STATE |
| NON-INTERACTION | HOLD OR SILENCE PERIODS | - | NEGATIVE IMPACT INCREASES WITH DURATION |
| CONVERSATION | GENERAL CONVERSATION NOT SPECIFICALLY RELATED TO CALL REASON | + | POSITIVE FEELING STATE (PSYCHOLOGICAL NEEDS) |
| POSITIVE COMMENT | POSITIVE COMMENT AT THE END OF THE CALL | ++ | AFFIRMATION |

RELEVANCE ITEM DEFINITIONS

| RELEVACE ITEM | DESCRIPTION |
|---|---|
| RELATIONSHIP RISK | THESE ARE INTERACTIONS THAT HAD THE HIGHEST DEGREE OF MISCOMMUNICATION (TOP 10%) WITH NO POSITIVE OR CONVERSATIONAL DIALOGUE. |
| POSITIVE TURNAROUND | THESE ARE INTERACTIONS THAT HAD THE HIGHEST DEGREE OF MISCOMMUNICATION (TOP 10%) THAT ALSO CONTAINED POSITIVE CONVERSATION. |
| DEEPENED RELATIONSHIP | THESE ARE INTERACTIONS THAT CONTAINED A LARGE AMOUNT OF CONVERSATIONAL DIALOGUE. |
| CSR EXCESSIVE CONVERSATION | THESE ARE INTERACTIONS THAT CONTAINED A LARGE AMOUNT OF CONVERSATIONAL DIALOGUE. |
| SIMPLE CALL | THESE ARE THE MOST FREQUENT TYPE OF SIMPLE INTERACTIONS (CALLS THAT COULD BE ANSWERED THROUGH AUTOMATION). |
| DISTRESS HANDLING ISSUE | THESE ARE INTERACTIONS TAKEN BY YOUR POOREST PERFORMING CSRS (WITH RESPECT TO HANDLING DISTRESS) THAT HAD THE HIGHEST AMOUNT OF DISTRESS. |
| COMPANY PROCESS DISSATISFACTION | THESE ARE INTERACTIONS TAKEN BY YOUR BEST PERFORMING CSRS (WITH RESPECT TO HANDLING DISTRESS) THAT HAD THE HIGHEST AMOUNT OF DISTRESS. THESE INTERACTIONS ALSO OCCUR MOST FREQUENTLY POTENTIALLY INDICATING A SYSTEMIC PROCESS PROBLEM. |
| COMPANY PRODUCT DISSATISFACTION | THESE ARE INTERACTIONS TAKEN BY YOUR BEST PERFORMING CSRS (WITH RESPECT TO HANDLING DISTRESS) THAT HAD THE HIGHEST AMOUNT OF DISTRESS. THESE INTERACTIONS MAY INDICATE A SYSTEMIC PROBLEM WITH SPECIFIC PRODUCTS. |
| CSR PROCESS ISSUE | THESE ARE INTERACTIONS TAKEN BY YOUR POOREST PERFORMING CSRS (WITH RESPECT TO HOLD & SILENCE TIME) THAT HAD THE HIGHEST AMOUNT OF HOLD & SILENCE TIME. |
| BUSINESS PROCESS ISSUE | THESE ARE INTERACTIONS TAKEN BY YOUR BEST PERFORMING CSRS (WITH RESPECT TO HOLD & SILENCE TIME) THAT HAD THE HIGHEST AMOUNT OF HOLD & SILENCE TIME. |
| SALES PROCESS ISSUE | THESE ARE THE LONGEST INTERACTIONS HANDLED BY YOUR MOST EFFECTIVE CSRS (WITH RESPECT TO SALES EFFECTIVENESS) WHERE THERE WAS NO SALE POTENTIALLY INDICATING A PROBLEM WITH SALES PROCESSES. |

RELEVANCE ITEM DEFINITIONS (CONTINUED)

| RELEVANCE ITEM | DESCRIPTION |
|---|---|
| SALES PRODUCT ISSUE | THESE ARE THE LONGEST INTERACTIONS HANDLED BY YOUR MOST EFFECTIVE CSRS (WITH RESPECT TO SALES EFFECTIVENESS) WHERE THERE WAS NO SALE POTENTIALLY INDICATING A PROBLEM WITH THE OFFER ITSELF. |
| COLLECTIONS PROCESS ISSUE | THESE ARE INTERACTIONS TAKEN BY YOUR BEST COLLECTIONS AGENTS (WITH RESPECT TO EFFECTIVENESS) THAT DID NOT END IN AN ACKNOWLEDGMENT TO PAY. |
| EFFECTIVE NEGOTIATIONS | THESE ARE EXAMPLES ON INTERACTIONS WHERE THE CUSTOMER ACCEPTED THE OFFER AND THE CSR EXHIBITED A STRONG ABILITY TO NEGOTIATE EFFECTIVELY. |
| CSR MISSED SALES OPPORTUNITY | THESE ARE INTERACTIONS HANDLED BY YOUR MOST INEFFECTIVE CSRS (WITH RESPECT TO SALES EFFECTIVENESS) WHERE THE CUSTOMER EXPRESSED A NEED OR WANT BUT NO SALE WAS MADE. |
| CSR MISSED COLLECTIONS OPPORTUNITY | THESE ARE INTERACTIONS HANDLED BY YOUR MOST INEFFECTIVE CSRS (WITH RESPECT TO COLLECTIONS EFFECTIVENESS) WHERE THE CUSTOMER EXPRESSED A QUALIFIED ACKNOWLEDGMENT OF DEBT BUT NOW AGREEMENT TO PAY WAS REACHED |
| ROUTING ISSUE | THESE ARE THE LONGEST INTERACTIONS THAT ENDED IN A TRANSFER TAKEN BY YOUR BEST PERFORMING CSRS (WITH RESPECT TO TRANSFER INCIDENCE RATE). |
| CSR TRANSFER ISSUE | THESE ARE THE LONGEST INTERACTIONS THAT ENDED IN A TRANSFER TAKEN BY YOUR POOREST PERFORMING CSRS (WITH RESPECT TO TIME BEFORE TRANSFER). |
| AT RISK TRANSACTIONS | THESE ARE THE INTERACTIONS WHICH CONTAINED DESKTOP APPLICATION USAGE THAT MIGHT INDICATE AN "AT RISK" AND POTENTIALLY COSTLY TRANSACTION. |
| CSR RISK HANDLING | THESE ARE INTERACTIONS WHICH CONTAINED DESKTOP APPLICATION USAGE THAT MIGHT INDICATE AN "AT RISK" AND POTENTIALLY COSTLY TRANSACTION HANDLED BY CSRS THAT DO THIS MOST FREQUENTLY. |
| CSR APPLICATION USAGE | THESE ARE INTERACTIONS TAKEN BY CSRS WHO HAVE THE HIGHEST ON AVERAGE "SCREEN" USAGE WITH THEIR APPLICATIONS RELATIVE TO THEIR PEERS. |
| APPLICATION DESIGN | THESE ARE INTERACTIONS TAKEN BY WHO HAVE THE LOWEST ON AVERAGE "SCREEN" USAGE WITH THEIR APPLICATIONS RELATIVE TO THEIR PEERS. |

FIG. 25

NOTIFICATION AND FOLLOW-UP ACTION DETAIL FOR EACH RELEVANCE ITEM

| RELEVANCE ITEM | WHO NOTIFIED... | FOLLOW-UP ACTION |
|---|---|---|
| RELATIONSHIP RISK | ACCOUNT/RETENTION TEAM | CONSIDER OUTREACH TO CUSTOMER |
| POSITIVE TURNAROUND | CONTACT CENTER MANAGEMENT OR AUTOMATED RECOGNITION SYSTEM | PROVIDE POSITIVE RECOGNITION TO CSR |
| DEEPENED RELATIONSHIP | OUTBOUND SALES OR CRM DATABASE | CONSIDER CUSTOMER FOR FUTURE SALES OPPORTUNITY |
| CSR EXCESSIVE CONVERSATION | CSR COACHES/SUPERVISORS | COACH CSR ON EXCESSIVE CONVERSATION |
| SIMPLE CALL | SELF-SERVICE TEAM (e.g., IVR AND WEB TEAM) | CONSIDER ADDING/IMPROVING AUTOMATION FOR THIS CALL TYPE |
| DISTRESS HANDLING ISSUE | CSR COACHES/SUPERVISORS | COACH CSR ON HANDLING DISTRESS |
| COMPANY PROCESS DISSATISFACTION | MARKETING/PRODUCT MANAGEMENT | INVESTIGATE FOR PRODUCT/SERVICE AND RELATED PROCESS PROBLEM |
| COMPANY PRODUCT DISSATISFACTION | CSR COACHES/SUPERVISORS | COACH CSR ON REDUCING HOLD & SILENCE TIME |
| CSR PROCESS ISSUE | CSR COACHES/SUPERVISORS | COACH CSR ON REDUCING HOLD & SILENCE TIME |
| BUSINESS PROCESS ISSUE | CONTACT CENTER MANAGEMENT | CONSIDER REDESIGNING BUSINESS PROCESS TO REDUCE HOLD & SILENCE TIME |
| SALES PROCESS ISSUE | SALES MANAGEMENT | INVESTIGATE REDESIGNING SALES PROCESS/OFFER |

FIG. 26

NOTIFICATION AND FOLLOW-UP ACTION DETAIL FOR EACH
RELEVANCE ITEM (CONTINUED)

| RELEVANCE ITEM | WHO NOTIFIED... | FOLLOW-UP ACTION |
|---|---|---|
| SALES PRODUCT ISSUE | VP SALES/VP COLLECTIONS | PROVIDE POSITIVE RECOGNITION TO CSR |
| COLLECTIONS PROCESS ISSUE | COLLECTIONS MANAGEMENT | INVESTIGATE REDESIGNING COLLECTIONS PROCESS/CONCESSIONS |
| EFFECTIVE NEGOTIATIONS | SALES/COLLECTIONS MANAGEMENT OR AUTOMATED RECOGNITION SYSTEM | PROVIDE POSITIVE RECOGNITION TO CSR |
| CSR MISSED SALES OPPORTUNITY | SALES CSR COACHES/SUPERVISORS | COACH CSR ON EFFECTIVELY DRIVING TO SALE |
| CSR MISSED COLLECTIONS OPPORTUNITY | COLLECTIONS CSR COACHES/SUPERVISORS | COACH CSR ON NEGOTIATING COLLECTIONS OFFER |
| ROUTING ISSUE | CALL ROUTING TEAM | RE-EVALUATE CALL ROUTING AND GROUP DESIGN |
| CSR TRANSFER ISSUE | CSR COACHES/SUPERVISORS | COACH CSR ON IMPROVING CALL ROUTING |
| AT RISK TRANSACTIONS | CFO/RISK DEPARTMENT | MINIMIZE/UNWIND LIABILITY |
| CSR RISK HANDLING | CSR COACHES/SUPERVISORS | COACH CSR ON RISK COMPLIANCE ISSUES |
| CSR APPLICATION USAGE | CSR COACHES/SUPERVISORS | COACH CSR ON EFFECTIVE APPLICATION USAGE |
| APPLICATION DESIGN | IT APPLICATION DEVELOPMENT | CONSIDER RE-DESIGN OF APPLICATIONS FOR IMPROVED CSR EFFECTIVENESS |

SYSTEM AND METHODS FOR DETERMINING TRENDS IN ELECTRONIC COMMUNICATIONS

CROSS-REFERENCE TO RELATED APPLICATIONS

The present invention claims priority to U.S. Provisional Patent Application No. 60/976,372, filed Sep. 28, 2007.

TECHNICAL FIELD

The invention relates to a method and system for analyzing an electronic communication, more particularly, to analyzing telephonic communications between customers and a contact center to determine and display the most relevant communications to an organization or business.

BACKGROUND

It is known to utilize telephone call centers to facilitate the receipt, response and routing of incoming-telephone calls relating to customer service, retention, and sales. Generally, a customer is in contact with a customer service representative ("CSR") or call center agent who is responsible for answering the customer's inquiries and/or directing the customer to the appropriate individual, department, information source, or service as required to satisfy the customer's needs. It is also known to utilize a web based system to facilitate requests and inquiries related to customer service.

At the contact center, a customer is in contact with a customer service representative ("CSR") or CSR agent who is responsible for answering the customer's inquiries and directing the customer to the appropriate individual, department, information source, or service as required to satisfy the customer's needs. At the contact center, the customer may also enter into an automated self-service system such as, for example, an interactive voice response ("IVR") system. In an IVR system, the customer speaks to the IVR system directly and has the call processed accordingly. It is also well known to provide self-service systems such as an Internet web-based system to transmit inquiries and identify possible solutions.

It is also known to monitor calls between a customer and a call center agent. Accordingly, call centers typically employ individuals responsible for listening to the conversation between the customer and the agent. Many companies have in-house call centers to respond to customers complaints and inquiries. In many case, however, it has been found to be cost effective for a company to hire third party telephone call centers to handle such inquiries. As such, the call centers may be located thousands of miles away from the actual sought manufacturer or individual. This often results in use of inconsistent and subjective methods of monitoring, training and evaluating call center agents. These methods also may vary widely from call center to call center.

While monitoring such calls may occur in real time, it is often more efficient and useful to record the call for later review. Information gathered from the calls is typically used to monitor the performance of the call center agents to identify possible training needs. Based on the review and analysis of the conversation, a monitor can make suggestions or recommendations to improve the quality of the customer interaction. However, with thousands of telephonic communications between customers and call centers on a daily basis, it is difficult for a business or organization to identify which calls and portions of calls are the most relevant from the thousands of calls received.

Accordingly, there is a need in customer relationship management ("CRM") for tools useful for breaking down a communication between a customer and a CSR into objects and segments that may be classified into categories for analysis. From these segments, it is desirable to determine the most relevant interactions between CSRs and customers to identify the most highly relevant communications for a business or organization. It is also desirable to provide the identified relevant interactions to specific parts of a business or organization with specific follow-through actions. It is also desirable to provide an interactive user interface that provides the identified highly relevant interaction and explains the significance of the interaction for the business or organization.

The present invention is provided to solve the problems discussed above and other problems, and to provide advantages and aspects not provided by prior systems of this type. A full discussion of the features and advantages of the present invention is deferred to the following detailed description, which proceeds with reference to the accompanying drawings.

SUMMARY

An exemplary method for analyzing a plurality of telephonic communications between one or more customers and a contact center is disclosed. The method may comprise determining one or more interaction outcomes that are meaningful to one or more parts of an organization. The method may further comprise identifying relevant interactions from the plurality of telephonic communications, wherein the identifying comprises applying a predefined set of rules the are to the plurality of telephonic communications. The identified relevant interactions may be provided to one or more respective parts of the organization.

Additionally, the exemplary method may further comprise providing explanatory information for the identified relevant telephonic communications to the one or more respective parts of the organization. The method may further comprise providing one or more follow-up actions for the identified relevant telephonic communications to the one or more respective parts of the organization. In addition, the predefined set of rules used to identify the relevant interaction may includes at least one of the one or more interaction outcomes.

The disclosure also encompasses program products for implementing the method outlined-above. In such a product, the programming is embodied in or carried on a machine-readable medium.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which:

FIG. 12 is a block diagram illustrating classification of communication objects according to an exemplary embodiment of the present invention;

FIG. 13 is a table illustrating a data model according to an exemplary embodiment of the present invention;

FIG. 14 is a segment type data model according to an exemplary embodiment of the present invention;

FIGS. 22-23 are tables that provide exemplary relevance items for a business or organization according to an exemplary embodiment of the present invention;

FIGS. 25-26 illustrate tables that indicate relevance items, personnel that should be notified of the relevant item, and follow-up actions associated with the relevance items according to an exemplary embodiment of the present invention;

DETAILED DESCRIPTION

Figure 1:
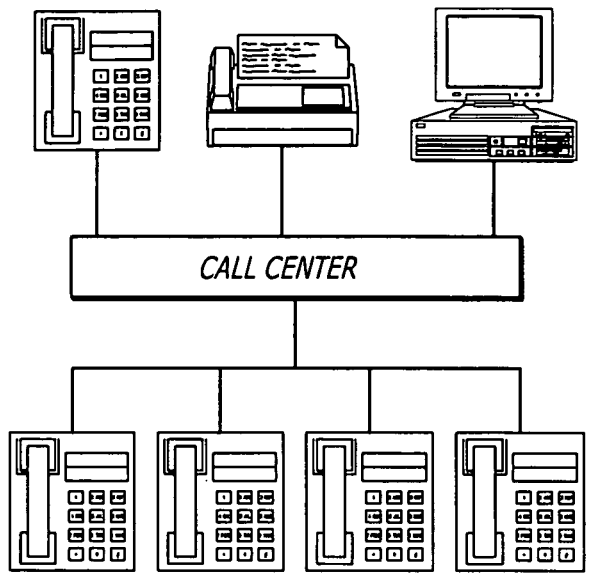
FIG. 1 is a block diagram of call center.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIGS. 1-34, a method and system for analyzing an electronic communication between a customer and a contact center is provided. A "contact center" as used herein can include any facility or system server suitable for receiving and recording electronic communications from customers. Such communications can include, for example, telephone calls, facsimile transmissions, e-mails, web interactions, voice over IP ("VoIP") and video. It is contemplated that these communications may be transmitted by and through any type of telecommunication device and over any medium suitable for carrying data. For example, the communications may be transmitted by or through telephone lines, cable or wireless communications. As shown in FIG. 1, the contact center of the present invention is adapted to receive and record varying electronic communications and data formats that represent an interaction that may occur between a customer (or caller) and a contact center agent during fulfillment of a customer and agent transaction.

Process descriptions or blocks in figures should be understood as representing modules, segments, or portions of code which include one or more executable instructions for implementing specific logical functions or steps in the process. Alternate implementations are included within the scope of the embodiments of the present invention in which functions may be executed out of order from that shown or discussed, including substantially concurrently or in reverse order, depending on the functionality involved, as would be understood by those having ordinary skill in the art.

Figure 2:
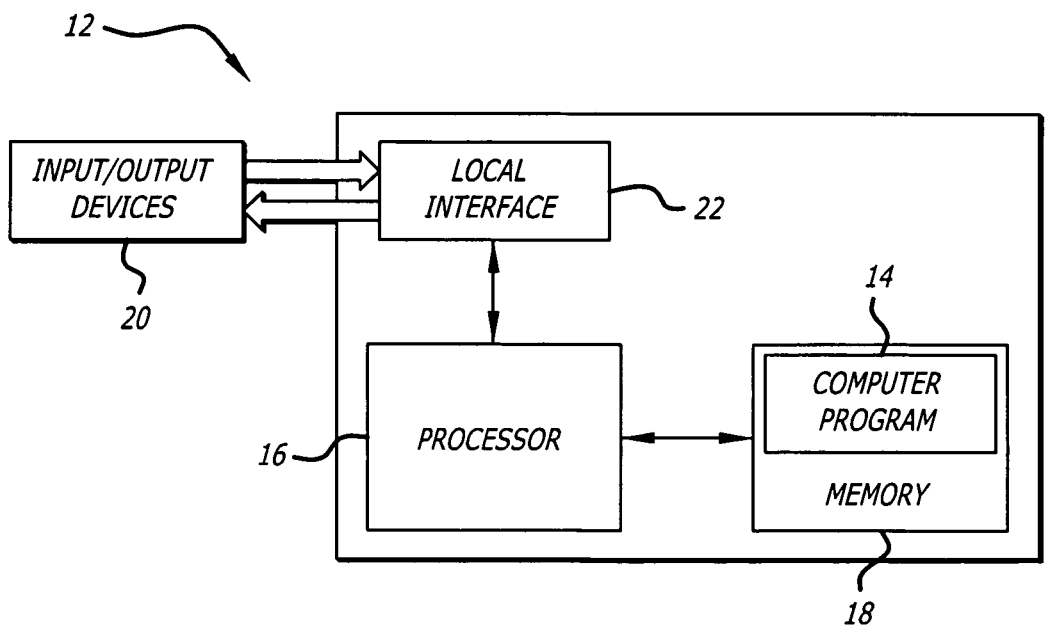
FIG. 2 is a block diagram of a computer used in connection with an exemplary embodiment of the present invention.

FIG. 2 is a block diagram of a computer or server 12. For purposes of understanding the hardware as described herein, the terms "computer" and "server" have identical meanings and are interchangeably used. Computer 12 includes control system 14. The control system 14 of the invention can be implemented in software (e.g., firmware), hardware, or a combination thereof. The control system 14 may be implemented in software, as an executable program, and is executed by one or more special or general purpose digital computer(s), such as a personal computer (PC; IBM-compatible, Apple-compatible, or otherwise), server computer, personal digital assistant, workstation, minicomputer, or mainframe computer. An example of a general purpose computer that can implement the control system 14 of the present invention is shown in FIG. 2. The control system 14 may reside in, or have portions residing in, any computer such as, but not limited to, a general purpose personal computer. Therefore, computer 12 of FIG. 2 may be representative of any computer in which the control system 14 resides or partially resides.

Generally, in terms of hardware architecture, as shown in FIG. 2, the computer 12 may include a processor 16, memory 18, and one or more input and/or output (I/O) devices 20 (or peripherals) that are communicatively coupled via a local interface 22. The local interface 22 may be, for example, but not limited to, one or more buses or other wired or wireless connections, as is known in the art. The local interface 22 may have additional elements, which are omitted for simplicity, such as controllers, buffers (caches), drivers, repeaters, and receivers, to enable communications. Further, the local interface may include address, control, and/or data connections to enable appropriate communications among the other computer components.

The processor 16 may be a hardware device for executing software, particularly software stored in memory 18. The processor 16 may be any custom made or commercially available processor, a central processing unit (CPU), an auxiliary processor among several processors associated with the computer 12, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80×8 or Pentium series microprocessor from Intel Corporation, a PowerPC microprocessor from IBM, a Sparc microprocessor from Sun Microsystems, Inc., or a 68xxx series microprocessor from Motorola Corporation.

The memory 18 may include any one or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, memory 18 may incorporate electronic, magnetic, optical, and/or other types of storage media. The memory 18 may have a distributed architecture where various components are situated remote from one another, but can be accessed by the processor 16.

The software in memory 18 may include one or more separate programs, each of which comprises an ordered listing of executable instructions for implementing logical functions. In the example of FIG. 2, the software in the memory 18 includes the control system 14 in accordance with the present invention and a suitable operating system (O/S) 24. A non-exhaustive list of examples of suitable commercially available operating systems 24 is as follows: (a) a Windows operating system available from Microsoft Corporation; (b) a Netware operating system available from Novell, Inc.; (c) a Macintosh operating system available from Apple Computer, Inc.; (d) a UNIX operating system, which is available for purchase from many vendors, such as the Hewlett-Packard Company, Sun Microsystems, Inc., and AT&T Corporation; (e) a LINUX operating system, which is freeware that is readily available on the Internet; (f) a run time Vxworks operating system from WindRiver Systems, Inc.; or (g) an appliance-based operating system, such as that implemented in handheld computers or personal digital assistants (PDAs) (e.g., PalmOS available from Palm Computing, Inc., and Windows CE available from Microsoft Corporation). The operating system 24 may control the execution of other computer programs, such as the control system 14, and provides scheduling, input-output control, file and data management, memory management, and communication control and related services.

The control system 14 may be a source program, executable program (object code), script, or any other entity comprising a set of instructions to be performed. When a source program, the program needs to be translated via a compiler, assembler, interpreter, or the like, which may or may not be included within the memory 18, so as to operate properly in connection with the O/S 24. Furthermore, the control system 14 may be written as (a) an object oriented programming language, which has classes of data and methods, or (b) a procedure programming language, which has routines, subroutines, and/or functions, for example but not limited to, C, C+F, C# (C Sharp), Pascal, Basic, Fortran, Cobol, Perl, Java, and Ada. The I/O devices 20 may include input devices, for example but not limited to, a keyboard, mouse, scanner, microphone, touch screens, interfaces for various medical devices, bar code readers, stylus, laser readers, radio-frequency device readers, etc. Furthermore, the I/O devices 20 may also include output devices, for example but not limited to, a printer, bar code printers, displays, etc. Finally, the I/O devices 20 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer 12 is a PC, server, workstation, PDA, or the like, the software in the memory 18 may further include a basic input output system (BIOS) (not shown in FIG. 2). The BIOS is a set of software routines that initialize and test hardware at startup, start the O/S 24, and support the transfer of data among the hardware devices. The BIOS is stored in ROM so that the BIOS can be executed when the computer 12 is activated.

When the computer 12 is in operation, the processor 16 is configured to execute software stored within the memory 18, to communicate data to and from the memory 18, and to generally control operations of the computer 12 pursuant to the software. The control system 14 and the O/S 24, in whole or in part, but typically the latter, are read by the processor 16, perhaps buffered within the processor 16, and then executed.

When the control system 14 is implemented in software, as is shown in FIG. 2, it should be noted that the control system 14 can be stored on any computer readable medium for use by or in connection with any computer related system or method. In the context of this document, a "computer-readable medium" can be any means that can store, communicate, propagate, or transport the program for use by or in connection with the instruction execution system, apparatus, or device. The computer readable medium can be for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory. The control system 14 can be embodied in any computer-readable medium for use by or in connection with an instruction execution system, apparatus, or device, such as a computer based system, processor containing system, or other system that can fetch the instructions from the instruction execution system, apparatus, or device and execute the instructions.

Where the control system 14 is implemented in hardware, the control system 14 may be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The present invention may be implemented in one or more modules using hardware, software, and/or a combination of hardware and software. Specifically, the individual functions of the present invention may be implemented as one or more modules, each module having one or more particular functions and/or purposes to carry out the one or more features of the embodiments of the present invention.

In an exemplary embodiment, the one or more modules may include one or more executable programs or portions of one or more executable programs comprising one or more sets of instructions to be performed by the control system 14. Although the invention is described in terms of a plurality of functions, it should be noted that the individual functions of the embodiments described herein may be implemented in only one or a plurality of modules. A module, therefore, may include one or more functions, as described herein.

Figure 3:
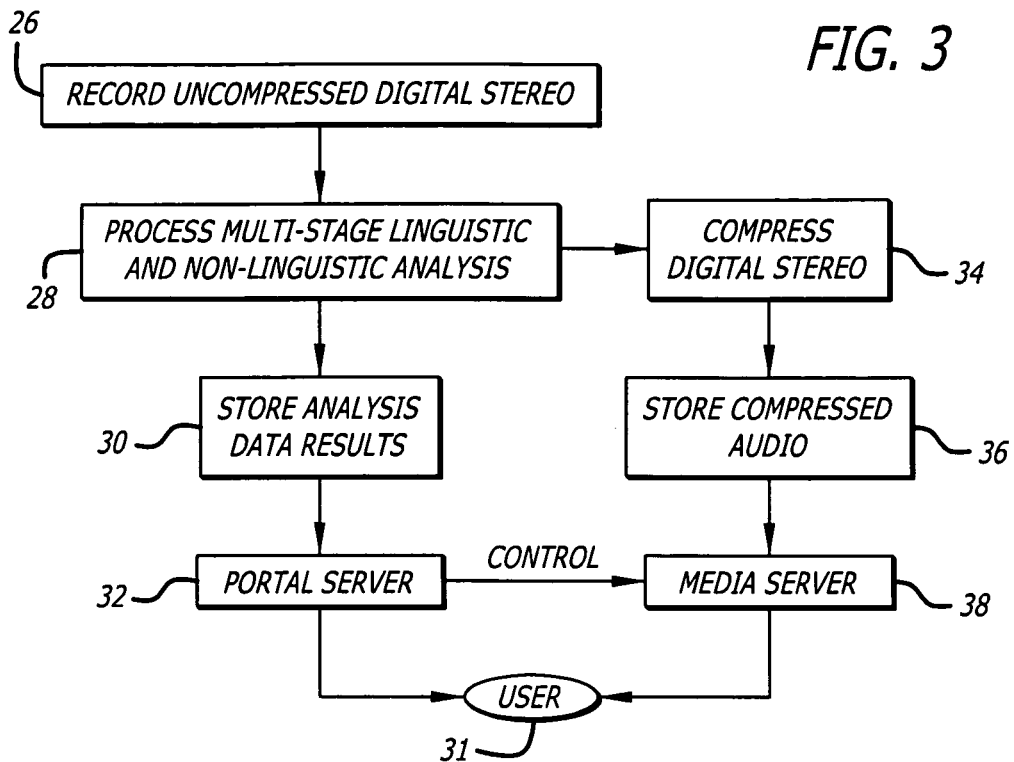
FIG. 3 is a flow chart illustrating the process of analyzing a telephonic communication in accordance with an exemplary embodiment of the present invention.

FIG. 3 illustrates an uncompressed digital stereo audio waveform of a conversation between a customer and a call center agent that is recorded and separated into customer voice data and call center agent voice data 26. The voice data associated with the audio waveform is then mined and analyzed using multi-stage linguistic and non-linguistic analytic tools 28. The analysis data is stored 30 and can be accessed by a user 31 (e.g., CSR supervisor) through an interface portal 32 for subsequent review 32. The digital stereo audio waveform is compressed 34 and stored 36 in an audio file which is held on a media server 38 for subsequent access through the interface portal 32.

The method of the present invention is configured to postpone audio compression until analysis of the audio data is complete. This delay allows the system to apply the analytic tools to a truer and clearer hi-fidelity signal. The system employed in connection with the present invention also minimizes audio distortion, increases fidelity, eliminates gain control and requires no additional filtering of the signal.

Figure 4:
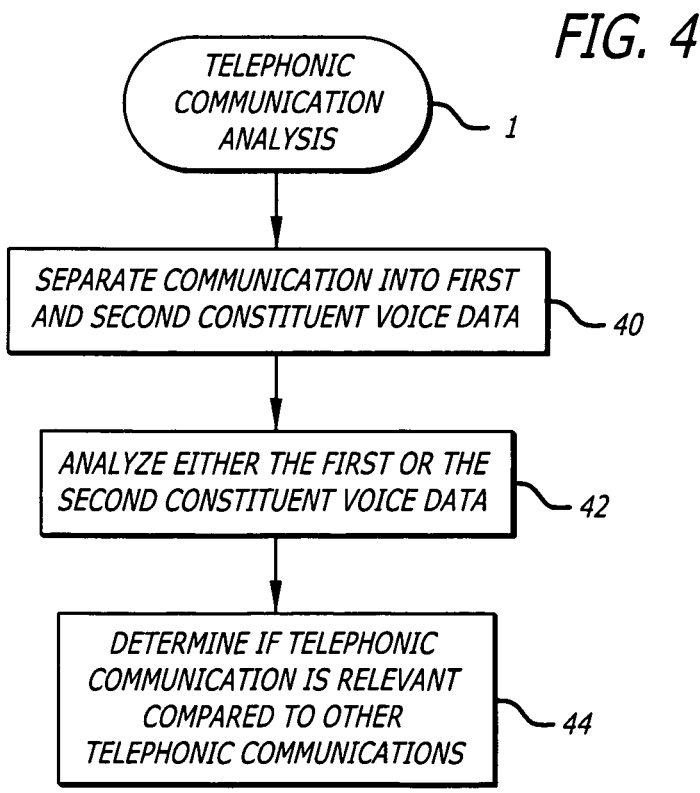
FIG. 4 is a flow chart illustrating the process of analyzing a telephonic communication in accordance with an exemplary embodiment of the present invention.

As shown in FIG. 4, the method of the present invention more specifically comprises the step of separating a telephonic communication 2 into first constituent voice data and second constituent voice data 40. One of the first or second constituent voice data may then be separately analyzed at step 42. At step 44, the first and/or second voice data may be analyzed to determine relevant portions of the voice data relative to other telephonic communications. This may enable a business or organization to determine the most relevant interactions to focus on.

The telephonic communication 2 being analyzed may be one of numerous calls stored within a contact center server 12, or communicated to a contact center during a given time period. Accordingly, the present method contemplates that the telephonic communication 2 being subjected to analysis is selected from the plurality of telephonic communications. The selection criteria for determining which communication to analyze may vary. For example, the communications coming into a contact center can be automatically categorized into a plurality of call types using an appropriate algorithm. For example, the system may employ a word-spotting algorithm that categorizes communications 2 into particular types or categories based on words used in the communication. In one embodiment, each communication 2 is automatically categorized as a service call type (e.g., a caller requesting assistance for servicing a previously purchased product), a retention call type (e.g., a caller expressing indignation, or having a significant life change event), or a sales call type (e.g., a caller purchasing an item offered by a seller). In one scenario, it may be desirable to analyze all of the "sales call type" communications received by a contact center during a predetermined time frame.

Alternatively, the communications 2 may be grouped according to customer categories, and the user may desire to analyze the communications 2 between the call center and communicants within a particular customer category. For example, it may be desirable for a user to perform an analysis only of a "platinum customers" category, consisting of high end investors, or a "high volume distributors" category comprised of a user's best distributors.

In one embodiment the telephonic communication 2 is a telephone call in which a telephonic signal is transmitted. As many be seen in FIGS. 5 and 6, a customer sending a telephonic signal may access a contact center 10 through the public switched telephone network (PSTN) 203 and an automatic call distribution system (PBX/ACD) 205 directs the communication to one of a plurality of agent work stations 211, 213. Each agent work station 211, 213 may include, for example, a computer 215 and a telephone 213.

When analyzing voice data, it is preferable to work from a true and clear hi-fidelity signal. This is true both in instances in which the voice data is being translated into a text format for analysis, or in instance in which an analysis model is being applied directly to an audio waveform, audio stream or file containing voice data.

Figure 5:
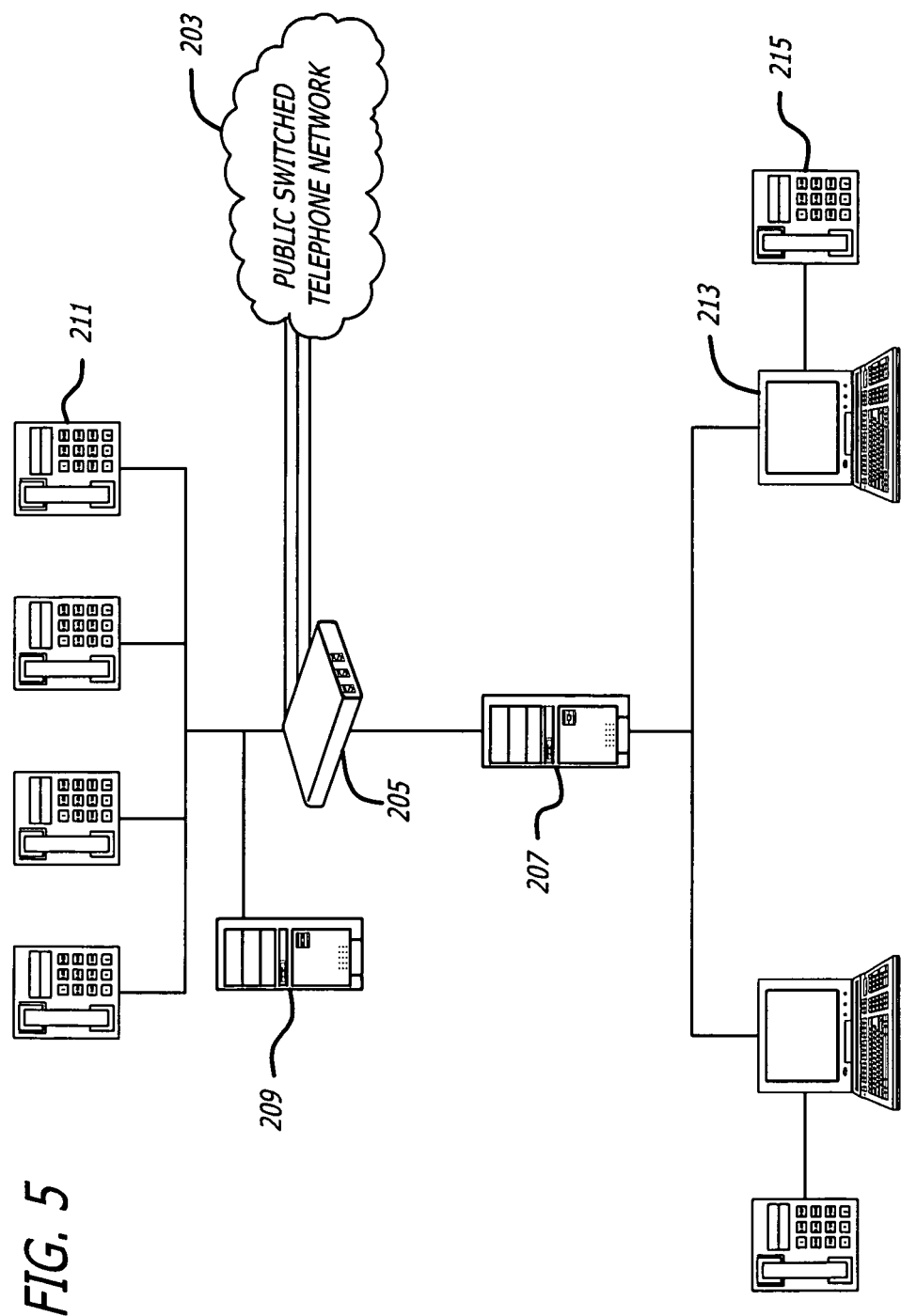
FIG. 5 is a block diagram of a telephonic communication system according to an exemplary embodiment of the present invention.

FIG. 5 illustrates a telephonic communication system 201, such as a distributed private branch exchange (PBX), having a public switched telephone network (PSTN) 203 connected to the PBX through a PBX switch 205.

The PBX switch 205 may provide an interface between the PSTN 203 and a local network. The interface may be controlled by software stored on a telephony server 207 coupled to the PBX switch 205. The PBX switch 205, using interface software, may connect trunk and line station interfaces of the public switch telephone network 203 to stations of a local network or other peripheral devices contemplated by one skilled in the art. The PBX switch may be integrated within telephony server 207. The stations may include various types of communication devices connected to the network, including the telephony server 207, a recording server 209, telephone stations 211, and client personal computers 213 equipped with telephone stations 215. The local network may further include fax machines and modems.

Generally, in terms of hardware architecture, the telephony server 207 may include a processor, memory, and one or more input and/or output (I/O) devices (or peripherals) that are communicatively coupled via a local interface. The processor may be any custom-made or commercially available processor, a central processing unit (CPU), an auxiliary processor among several processors associated with the telephony server 207, a semiconductor based microprocessor (in the form of a microchip or chip set), a macroprocessor, or generally any device for executing software instructions. The memory of the telephony server 207 may include any one or a combination of volatile memory elements (e.g., random access memory (RAM, such as DRAM, SRAM, SDRAM, etc.)) and nonvolatile memory elements (e.g., ROM, hard drive, tape, CDROM, etc.). The telephony server 207 may further include a keyboard and a mouse for control purposes, and an attached graphic monitor for observation of software operation.

The telephony server 207 may incorporate PBX control software to control the initiation and termination of connections between stations and via outside trunk connections to the PSTN 203. In addition, the software may monitor the status of all telephone stations 211 in real-time on the network and may be capable of responding to telephony events to provide traditional telephone service. This may include the control and generation of the conventional signaling tones such as dial tones, busy tones, ring back tones, as well as the connection and termination of media streams between telephones on the local network. Further, the PBX control software may use a multi-port module 223 and PCs to implement standard PBX functions such as the initiation and termination of telephone calls, either across the network or to outside trunk lines, the ability to put calls on hold, to transfer, park and pick up calls, to conference multiple callers, and to provide caller ID information. Telephony applications such as voice mail and auto attendant may be implemented by application software using the PBX as a network telephony services provider.

Figure 7:
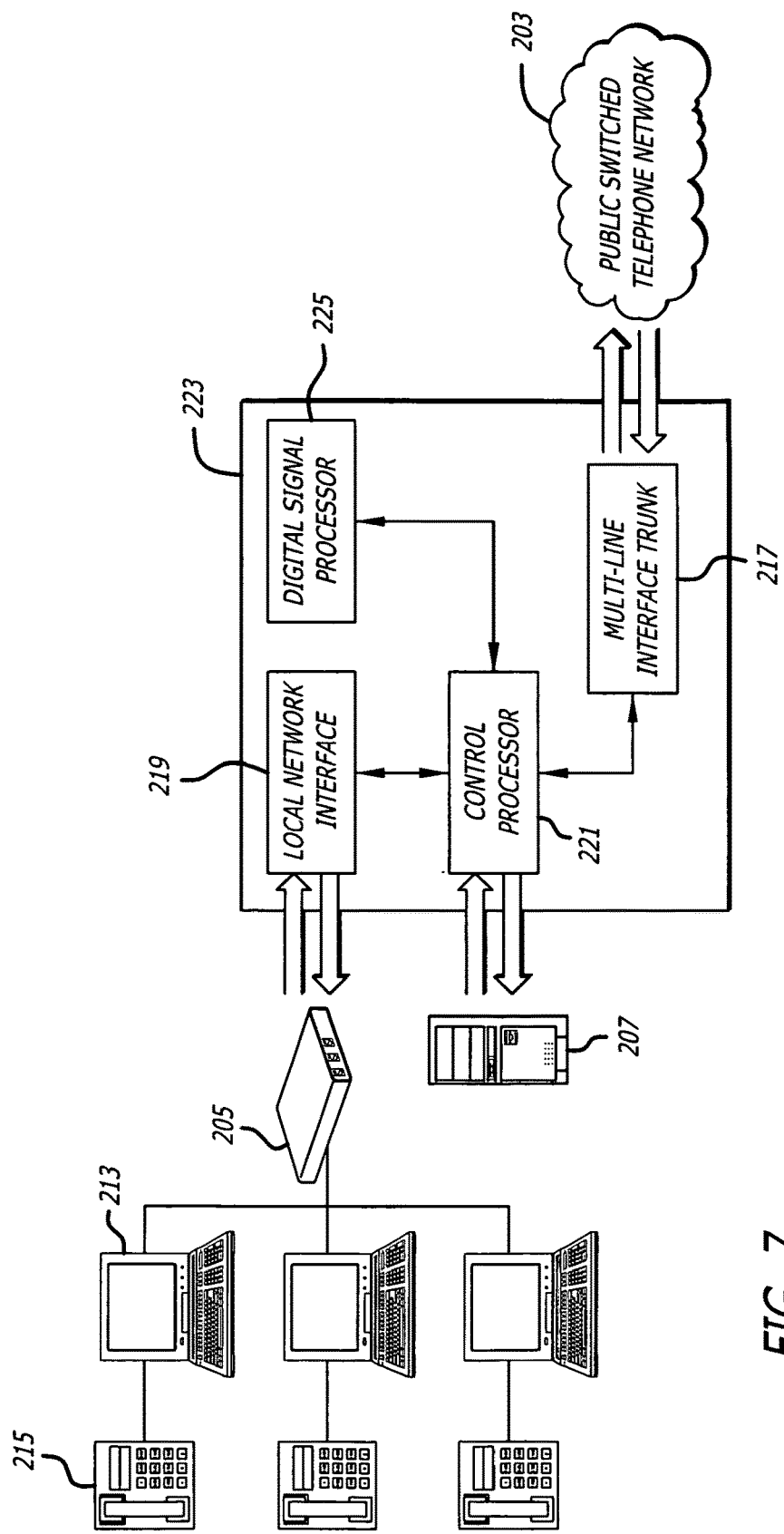
FIG. 7 is a block diagram of a telephonic communication system with a multi-port PSTN module according to an exemplary embodiment of the present invention.

Referring to FIG. 7, the telephony server 207 may be equipped with multi-port PSTN module 223 having circuitry and software to implement a trunk interface 217 and a local network interface 219. The PSTN module 223 may comprise a control processor 221 to manage the transmission and reception of network messages between the PBX switch 205 and the telephony network server 207. The control processor 221 also may be capable of directing network messages between the PBX switch 205, the local network interface 291, the telephony network server 207, and the trunk interface 217. The local network may use Transmission Control Protocol/Internet Protocol (TCP/IP). The network messages may contain computer data, telephony transmission supervision, signaling and various media streams, such as audio data and video data. The control processor 221 may direct network messages containing computer data from the PBX switch 205 to the telephony network server 207 directly through the multi-port PSTN module 223.

The control processor 221 may include buffer storage and control logic to convert media streams from one format to another, if necessary, between the trunk interface 217 and local network. The trunk interface 217 provides interconnection with the trunk circuits of the PSTN 203. The local network interface 219 provides conventional software and circuitry to enable the telephony server 207 to access the local network. The buffer RAM and control logic implement efficient transfer of media streams between the trunk interface 217, the telephony server 207, the digital signal processor 225, and the local network interface 219.

The trunk interface 217 utilizes conventional telephony trunk transmission supervision and signaling protocols required to interface with the outside trunk circuits from the PSTN 203. The trunk lines carry various types of telephony signals such as transmission supervision and signaling, audio, fax, or modem data to provide plain old telephone service (POTS). In addition, the trunk lines may carry other communication formats such T1, ISDN or fiber service to provide telephony or multimedia data images, video, text or audio.

The control processor 221 may manage real-time telephony event handling pertaining to the telephone trunk line interfaces, including managing the efficient use of digital signal processor resources for the detection of caller ID, DTMF, call progress and other conventional forms of signaling found on trunk lines. The control processor 221 also may manage the generation of telephony tones for dialing and other purposes, and controls the connection state, impedance matching, and echo cancellation of individual trunk line interfaces on the multi-port PSTN module 223.

Preferably, conventional PBX signaling is utilized between trunk and station, or station and station, such that data is translated into network messages that convey information relating to real-time telephony events on the network, or instructions to the network adapters of the stations to generate the appropriate signals and behavior to support normal voice communication, or instructions to connect voice media streams using standard connections and signaling protocols. Network messages are sent from the control processor 221 to the telephony server 207 to notify the PBX software in the telephony server 207 of real-time telephony events on the attached trunk lines. Network messages are received from the PBX Switch 205 to implement telephone call supervision and may control the set-up and elimination of media streams for voice transmission.

The local network interface 219 may include conventional circuitry to interface with the local network. The specific circuitry may be dependent on the signal protocol utilized in the local network. The local network may be a local area network (LAN) utilizing IP telephony. IP telephony integrates audio and video stream control with legacy telephony functions and may be supported through the H.323 protocol. H.323 is an International Telecommunication Union-Telecommunications protocol used to provide voice and video services over data networks. H.323 permits users to make point-to-point audio and video phone calls over a local area network. IP telephony systems can be integrated with the public telephone system through a local network interface 219, such as an IP/PBX-PSTN gateway, thereby allowing a user to place telephone calls from an enabled computer. For example, a call from an IP telephony client to a conventional telephone would be routed on the LAN to the IP/PBX-PSTN gateway. The IP/PBX-PSTN gateway translates H.323 protocol to conventional telephone protocol and routes the call over the conventional telephone network to its destination. Conversely, an incoming call from the PSTN 203 is routed to the IP/PBX-PSTN gateway and translates the conventional telephone protocol to H.323 protocol.

As noted above, PBX trunk control messages are transmitted from the telephony server 207 to the control processor 221 of the multi-port PSTN. In contrast, network messages containing media streams of digital representations of real-time voice are transmitted between the trunk interface 217 and local network interface 219 using the digital signal processor 225. The digital signal processor 225 may include buffer storage and control logic. Preferably, the buffer storage and control logic implement a first-in-first-out (FIFO)

data buffering scheme for transmitting digital representations of voice audio between the local network to the trunk interface 217. It is noted that the digital signal processor 225 may be integrated with the control processor 221 on a single microprocessor.

The digital signal processor 225 may include a coder/decoder (CODEC) connected to the control processor 221. The CODEC may be a type TCM29c13 integrated circuit made by Texas Instruments, Inc. For example, the digital signal processor 225 may receive an analog or digital voice signal from a station within the network or from the trunk lines of the PSTN 203. The CODEC converts the analog voice signal into in a digital from, such as digital data packets. It should be noted that the CODEC is not used when connection is made to digital lines and devices. From the CODEC, the digital data is transmitted to the digital signal processor 225 where telephone functions take place. The digital data is then passed to the control processor 221 which accumulates the data bytes from the digital signal processor 225. It is preferred that the data bytes are stored in a first-in-first-out (FIFO) memory buffer until there is sufficient data for one data packet to be sent according to the particular network protocol of the local network. The specific number of bytes transmitted per data packet depends on network latency requirements as selected by one of ordinary skill in the art. Once a data packet is created, the data packet is sent to the appropriate destination on the local network through the local network interface 219. Among other information, the data packet may contain a source address, a destination address, and audio data. The source address identifies the location the audio data originated from and the destination address identifies the location the audio data is to be sent.

The system may enable bi-directional communication by implementing a return path allowing data from the local network, through the local network interface 219, to be sent to the PSTN 203 through the multi-line PSTN trunk interface 217. Data streams from the local network are received by the local network interface 219 and translated from the protocol utilized on the local network to the protocol utilized on the PSTN 203. The conversion of data may be performed as the inverse operation of the conversion described above relating to the IP/PBX-PSTN gateway. The data stream may be restored in appropriate form suitable for transmission through to either a connected telephone 211, 215 or an interface trunk 217 of the PSTN module 223, or a digital interface such as a T1 line or ISDN. In addition, digital data may be converted to analog data for transmission over the PSTN 203.

Generally, the PBX switch of the present invention may be implemented with hardware or virtually. A hardware PBX has equipment located local to the user of the PBX system. The PBX switch 205 utilized may be a standard PBX manufactured by Avaya, Siemens AG, NEC, Nortel, Toshiba, Fujitsu, Vodavi, Mitel, Ericsson, Panasonic, or InterTel. In contrast, a virtual PBX has equipment located at a central telephone service provider and delivers the PBX as a service over the PSTN 203.

Turning again to FIG. 5, the system may include a recording server 209 for recording and separating network messages transmitted within the system. The recording server 209 may be connected to a port on the local network, as seen in FIG. 5. Alternatively, the recording server 209 may be connected to the PSTN trunk line. The recording server 209 may include control system software, such as recording software. The recording software of the invention may be implemented in software (e.g., firmware), hardware, or a combination thereof. The recording software may be implemented in software as an executable program, and is executed by one or more special or general purpose digital computer(s), such as a personal computer (PC; IBM-compatible, Apple-compatible, or otherwise), server, personal digital assistant, workstation, minicomputer, or mainframe computer. An example of a general purpose computer that can implement the recording software of the present invention is shown in FIG. 2. The recording software may reside in, or have portions residing in, any computer such as, but not limited to, a general purpose personal computer. Therefore, recording server 209 of FIG. 5 may be representative of any type of computer in which the recording software resides or partially resides.

Generally, hardware architecture may be the same as that discussed above and shown in FIG. 2. Specifically, the recording server 209 includes a processor, memory, and one or more input and/or output (I/O) devices (or peripherals) that are communicatively coupled via a local interface as previously described. The local interface can be, for example, but not limited to, one or more buses or other wired or wireless connections. The local interface may have additional elements, which are omitted for simplicity, such as controllers, buffers (caches), drivers, repeaters, and receivers, to enable communications. Further, the local interface may include address, control, and/or data connections to enable appropriate communications among the other computer components.

As noted above, the recording server 209 incorporates recording software for recording and separating a signal based on the source address and/or destination address of the signal. The method utilized by the recording server 209 depends on the communication protocol utilized on the communication lines to which the recording server 209 is coupled. In the communication system contemplated by the present invention, the signal carrying audio data of a communication between at least two users may be an analog signal or a digital signal in the form of a network message. In one embodiment, the signal is an audio data transmitted according to a signaling protocol, for example the H.323 protocol described above.

Figure 8:
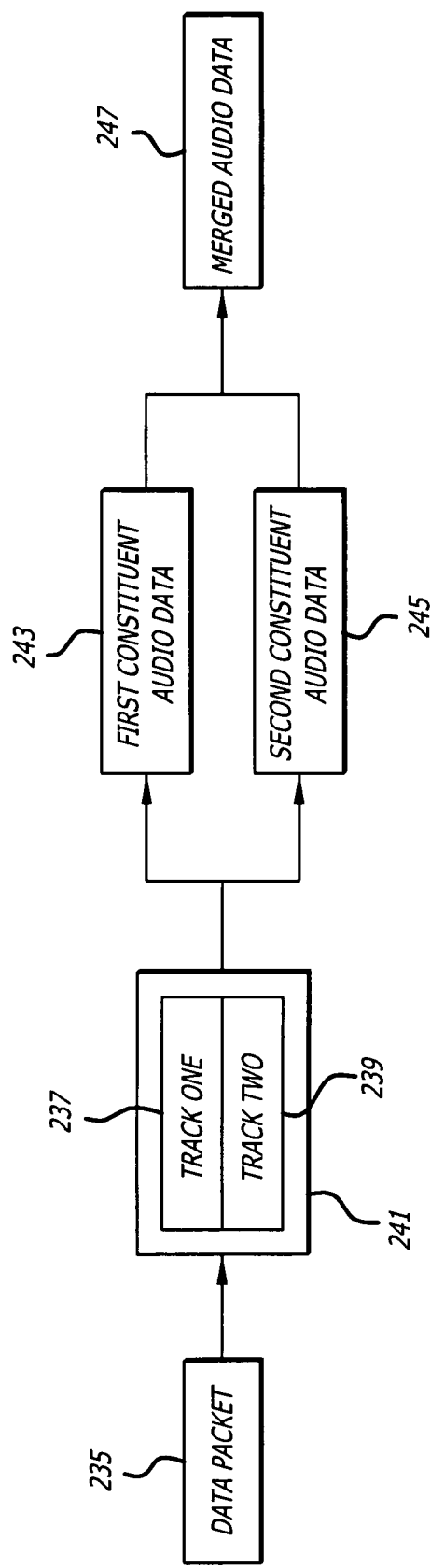
FIG. 8 is a flow chart illustrating the process of recording and separating a telephonic communication in accordance with an exemplary embodiment of the present invention.
Figure 9:
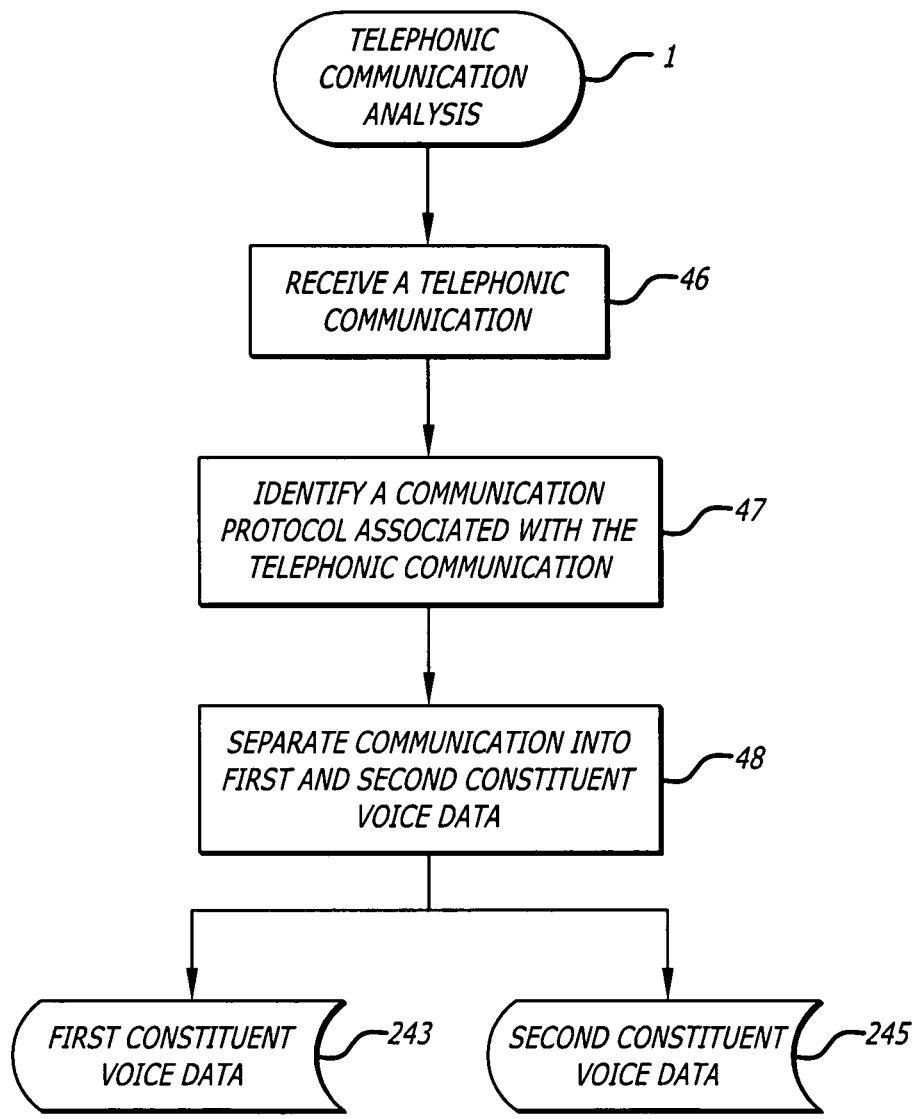
FIG. 9 is a flow chart illustrating the process of recording and separating a telephonic communication in accordance with an exemplary embodiment of the present invention.

An example of a communication between an outside caller and a call center agent utilizing the present system 200 is illustrated in FIG. 7 and described herein. In the embodiment of FIG. 7, when an outside caller reaches the system through the multi-line interface trunk 217, their voice signal may be digitized (if needed) in the manner described above, and converted into digital data packets 235 (as illustrated in FIG. 8) according to the communication protocol utilized on the local network of the system. The data packet 235 may comprise a source address identifying the address of the outside caller, a destination address identifying the address of the call center agent, and first constituent audio data comprising at least a portion of the outside caller's voice. The data packet 235 may further comprise routing data identifying how the data packet 235 should be routed through the system and other relevant data. Once the data packet 235 is created, the data packet 235 may be sent to the appropriate destination on the local network, such as to a call center agent, through the local network interface 219. The PBX and/or an automatic call distributor (ACD) 205 may determine the initial communication setup, such as the connection state, impedance matching, and echo cancellation, according to predetermined criteria.

Similar to the process described above, when the call center agent speaks, their voice is digitized (if needed) and converted into digital data packet 235 according to the communication protocol utilized on the local network. The data packet 235 comprises a source address identifying the address of the call center agent, a destination address identifying the address of the outside caller, and second constituent audio data comprising at least a portion of the call center agent's voice. The data packet 235 is received by the local network interface 219 and translated from the communication protocol utilized on the local network to the communication protocol utilized on the PSTN 203. The conversion of data can be performed as described above. The data packet 235 is restored in appropriate form suitable for transmission through to either a connected telephone 211 (illustrated in FIGS. 5 and/or 6), 215 or a interface trunk 217 of the PSTN module 223, or a digital interface such as a T1 line or ISDN. In addition, digital data may be converted to analog data for transmission through the PSTN 203.

The recording server 209 (as shown in FIGS. 5 and/or 6) may receive a data packet 235 comprising: the source address identifying the address of the outside caller, a destination address identifying the address of the call center agent, and the first constituent audio data comprising at least a portion of the outside callers voice. The recording server 209 may alternatively receive a data packet 235 comprising a source address identifying the address of the call center agent, a destination address identifying the address of the outside caller, and second constituent audio data comprising at least a portion of the customer's agent voice. It is understood by one of ordinary skill in the art that the recording server 209 is programmed to identify the communication protocol utilized by the local network and extract the audio data within the data packet 235. In one embodiment, the recording server 209 can automatically identify the utilized communication protocol from a plurality of communication protocols. The plurality of communication protocols can be stored in local memory or accessed from a remote database.

The recording server 209 may comprise recording software to record the communication session between the outside caller and the call center agent in a single data file in a stereo format. Now referring to FIG. 8, the first data file 241 has at least a first audio track 237 and a second audio track 239. Once a telephone connection is established between an outside caller and a call center agent, the recording software may create a first data file 241 to record the communication between the outside caller and the call center agent. It is contemplated that the entire communication session or a portion of the communication session can be recorded.

Upon receiving the data packet 235, the recording server 209 determines whether to record the audio data contained in the data packet 235 in either the first audio track 237 or the second audio track 239 of the first data file 241 as determined by the source address, destination address, and/or the audio data contained within the received data packet 235. Alternatively, two first data files can be created, wherein the first audio track is recorded to the one of the first data file and the second audio track is recorded to the second first data file. In one embodiment, if the data packet 235 comprises a source address identifying the address of the outside caller, a destination address identifying the address of the call center agent, and first constituent audio data, the first constituent audio data is recorded on the first audio track 237 of the first data file 241. Similarly, if the data packet 235 comprises a source address identifying the address of the call center agent, a destination address identifying the address of the outside caller, and second constituent audio data, the second constituent audio data is recorded on the second audio track 239 of the first data file 241. It should be noted the first and second constituent audio data can be a digital or analog audio waveform or a textual translation of the digital or analog waveform. The recording process may be repeated until the communication link between the outside caller and call center agent is terminated.

Figure 6:
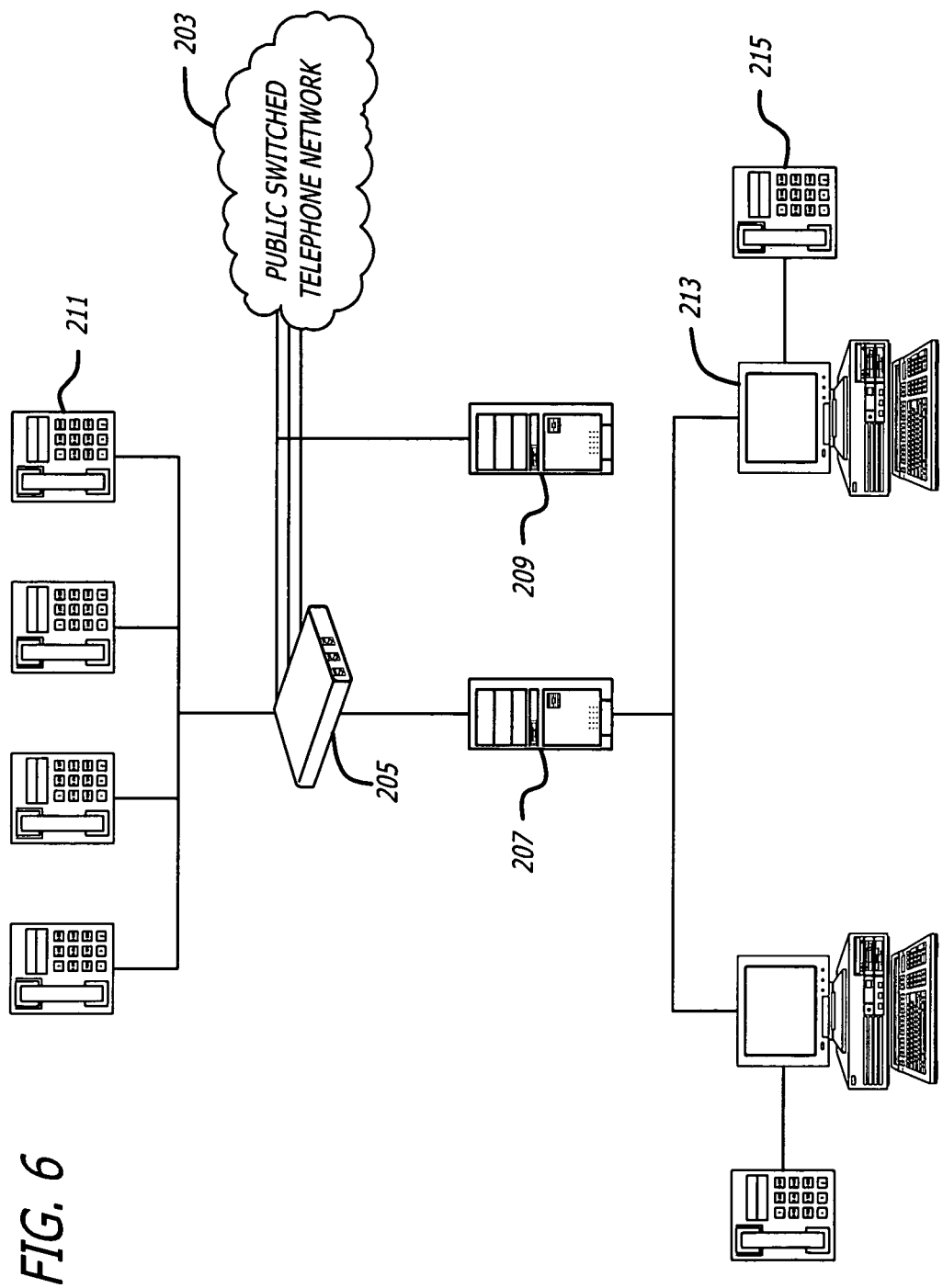
FIG. 6 is a block diagram of a telephonic communication system according to an exemplary embodiment of the present invention.

As noted above, the recording server 209 may be connected to the trunk lines of the PSTN 203 as seen in FIG. 6. The PSTN 203 may utilize a different protocol and therefore, the recording server 209 is configured to identify the communication protocol utilized by the PSTN 203, recognize the source and destination address of a signal and extract the audio data from the PSTN 203.

As shown in FIG. 8, once the communication link is terminated, the recording server 209 ends the recording session and stores the single data file having the recorded communication session in memory. After the first data file is stored in memory, the recording server 209 may extract either or both of the first constituent audio data from the first audio track of the first data file or the second constituent audio data from the second audio track of the first data file. In one embodiment, the first constituent audio data extracted from the first audio track is stored in a first constituent data file 243. Similarly, the second constituent audio data extracted from the second audio track may be stored in a second constituent data file 245. The first and second constituent data files 243, 245 can be compressed before being stored in memory. The extracted data can be in the form of a digital or analog audio waveform or can be a textual translation of the first or second constituent audio data. It is contemplated that either or both of the first constituent data file 243 or the second constituent data file 245 can be further analyzed or processed. For example, among other processes and analyses, filtering techniques can be applied to the first constituent data file and/or the second constituent data file. Moreover, event data, such as silence periods or over-talking, may be identified through analysis techniques known to those skilled in the art.

Further, as illustrated in FIG. 8, the first constituent data file 243 and second constituent data file 245 may be merged together into a single second data file 247. The first and second constituent data files may be merged in a stereo format where the first constituent audio data from the first constituent data file 243 is stored on a first audio track of the second data file 247 and the second constituent audio data from the second constituent data file 245 is stored on a second audio track of the second data file 247. Alternatively, the first and second constituent data files may be merged in a mono format where the first constituent audio data from the first constituent data file 243 and the second constituent audio data from the second constituent data file 245 are stored on a first audio track of the second data file 247. Additionally, the first and second constituent audio data may be merged into a document having a textual translation of the audio data. In such a case, identifiers may be associated with each of the merged first and second constituent audio data in order to associate the merged first constituent audio data with the outside caller, and associate the merged second constituent audio data with the call center agent. The second data file 247 may be compressed before being stored in memory.

It is known in the art that "cradle-to-grave" recording may be used to record all information related to a particular telephone call from the time the call enters the contact center to the later of: the caller hanging up or the agent completing the transaction. All of the interactions during the call are recorded, including interaction with an IVR system, time spent on hold, data keyed through the caller's key pad, conversations with the agent, and screens displayed by the agent at his/her station during the transaction.

Figure 10:
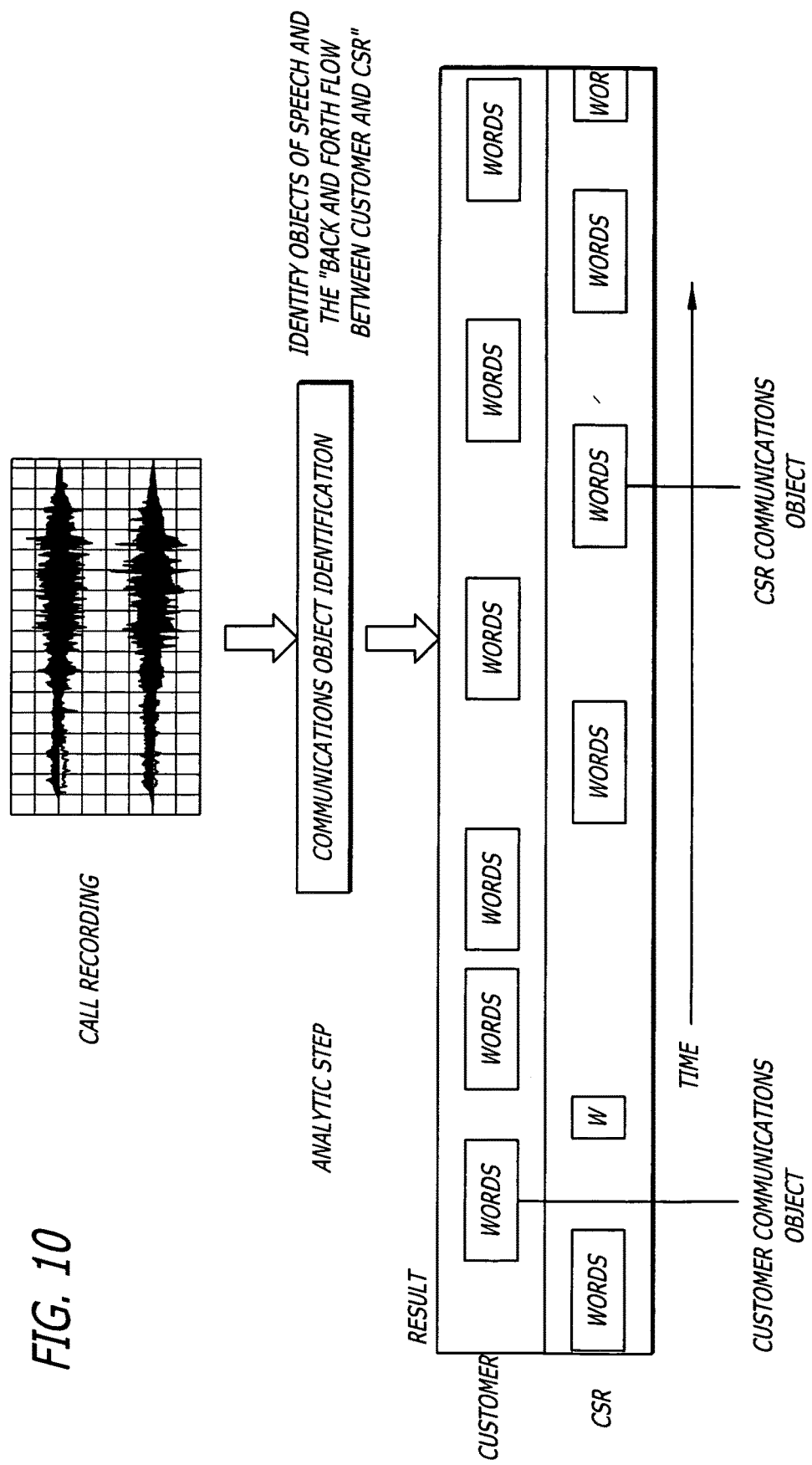
FIG. 10 is a block diagram illustrating customer and CSR communications object identification according to an exemplary embodiment of the present invention.
Figure 11:
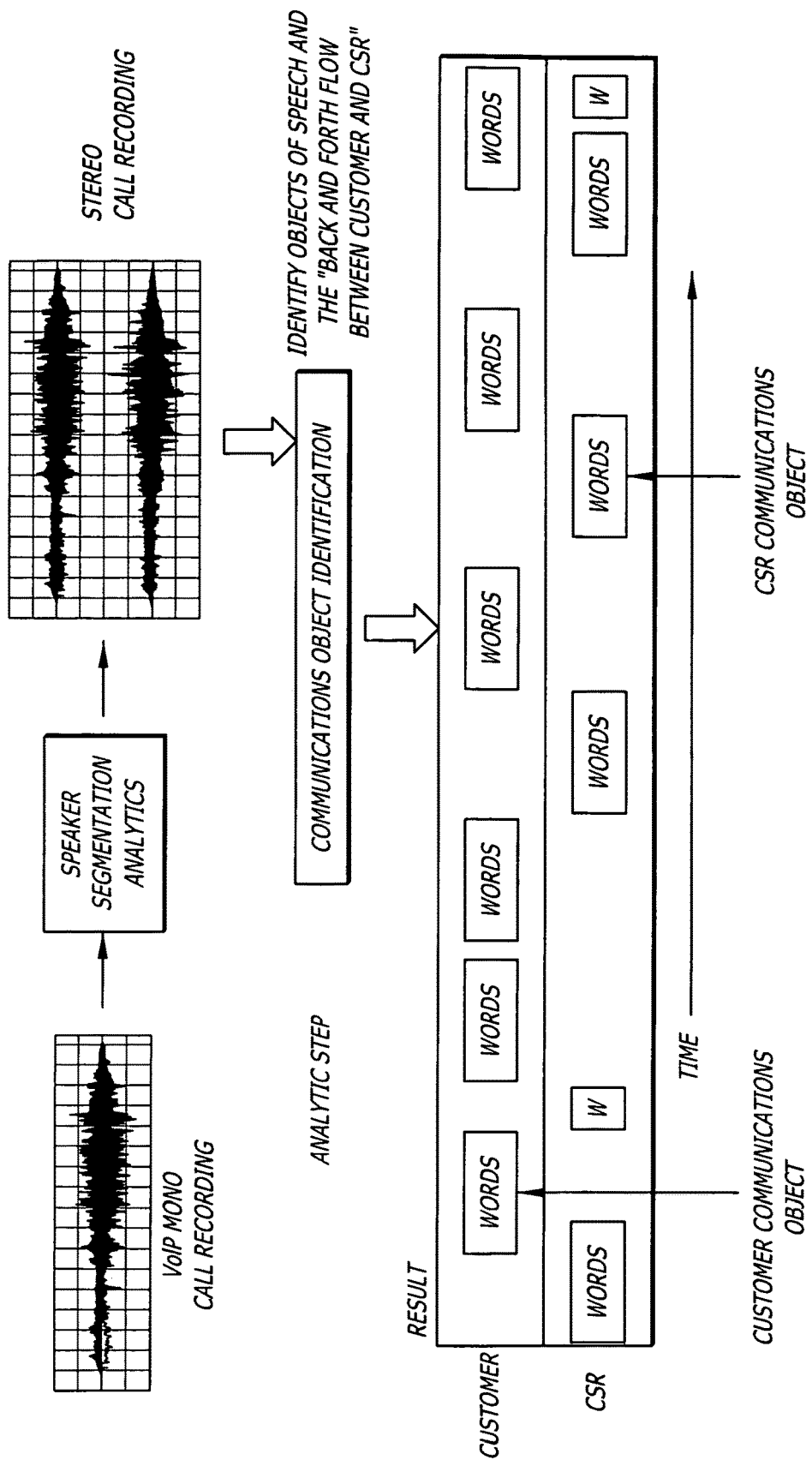
FIG. 11 is block diagram illustrating communications object identification from a VoIP (Voice Over Internet Protocol) mono recording using speaker segmentation analytics to achieve a stereo recording according to an exemplary embodiment of the present invention.

As shown in FIGS. 10-12, once the first and second constituent voice data are separated one from the other, each of the first and second constituent voice data can be independently mined and analyzed. It will be understood that "mining" as referenced herein is to be considered part of the process of analyzing the constituent voice data. It is also contemplated by the present invention that the mining and behavioral analysis be conducted on either or both of the constituent voice data.

Even with conventional audio mining technology, application of analysis models directly to an audio file can be very difficult. In particular, disparities in dialect, phonemes, accents and inflections can impede or render burdensome accurate identification of words. And while it is contemplated by the present invention that mining and analysis in accordance with the present invention can be applied directly to voice data configured in audio format, in a preferred embodiment of the present invention, the voice data to be mined and analyzed is first translated into a text file. It will be understood by those of skill that the translation of audio to text and subsequent data mining may be accomplished by systems known in the art. For example, the method of the present invention may employ software such as that sold under the brand name Audio Mining SDK by Scansoft, Inc., or any other audio mining software suitable for such applications. As shown in FIGS. 10-12, the separated voice data is used to form communication objects which may be typed (i.e., classified) into categories such as setup, information exchange, miscommunication, non-interaction, conversation, or positive comment. In particular, the method of the present invention searches for and identifies text-based keywords relevant to each of the predefined type categories. The typed communication objects may then be further categorized to form segments of objects according to type.

FIG. 10 illustrates a stereo call recording with voice data for a customer and a CSR. The voice data from the stereo recording is converted to text. Accordingly, there is separate text data for the customer communication and the CSR communication. Objects may be identified and typed (i.e., classified) within the text. Alternatively, as illustrated in FIG. 11, a mono (rather than stereo) call recording that may be from a VoIP (Voice Over Internet Protocol) may be used to form the stereo recording of the customer and the CSR using speaker segmentation analytics. Upon formation of the stereo recording, the communications objects of the customer and the CSR may be identified and typed (i.e., classified).

FIG. 12 illustrates the words of the CSR and customer as communications objects, as well as CTI (Computer Telephony Integration) events (e.g., a "hold" event). The communications objects may be typed (i.e., classified) as business related communications objects or as non-business (e.g., conversation) related communication objects. Objects may be further classified as non-interaction objects that are business related. For example, the CSR may place the customer on hold in order to speak with another CSR regarding the customer's situation.

Upon classification of the customer and CSR communication objects, segments of like objects may be formed. For example, communications objects may be combined to form segments related to call setup, information exchange, non-interaction, conversation, or positive comment.

FIG. 13 illustrates a table which indicates segment data elements. For example, segments may have a segment number which corresponds to their sequence number order of appearance in a telephonic communication. Segments may also have a duration of time associated with them, as well as an emotional vector that indicates the emotional direction of the customer (e.g., positive, negative, or neutral). Segments may also be identified with a primary topic. The personality of the segment may also be identified. For example, the personality may relate to information exchange (i.e., business-related communications) or may be classified by a personality type (e.g., emotions, thoughts, reflections, actions, or positive affirmation). The software application used during the same time period of the segment may also be affiliated with a segment. For example, a business application may be in use during the communications segment that relates to information exchange.

FIG. 14 illustrates a table indicating various exemplary types (i.e., classifications) of segments, such as setup, information exchange, miscommunication, non-interaction, conversation, and positive comment. FIG. 14 also illustrates that a segment vector (e.g., emotional direction) may be associated with a segment type. For example, setup and information exchange may have neutral ("0") vectors. Miscommunication segments and non-interaction segments may have negative ("−") vectors, as these segments may be considered unfavorable portions of a telephonic communication between a customer and a CSR. Conversation segments, which may be non-business related, may have a positive vector ("+"), as these segments may be perceived favorably by customers during a telephonic communication with a CSR. Positive comment segments (e.g., where a customer compliments a CSR) may have an increased positive vector ("++").

According to one embodiment of the present invention, a psychological behavioral model may also be used to analyze the voice data, and may be, for example, the Process Communication Model ("PCM") developed by Dr. Taibi Kahler. PCM is a psychological behavioral analytic tool which presupposes that all people fall primarily into one of six basic personality types: Reactor, Workaholic, Persister, Dreamer, Rebel and Promoter. Although each person is one of these six types, all people have parts of all six types within them arranged like a six-tier configuration. Each of the six types learns differently, is motivated differently, communicates differently, and has a different sequence of negative behaviors they engage in when they are in distress. Importantly, according to PCM, each personality type of PCM responds positively or negatively to communications that include tones or messages commonly associated with another of the PCM personality types. Thus, an understanding of a communicant's PCM personality type offers guidance as to an appropriate responsive tone or message or wording.

According to the PCM Model the following behavioral characteristics are associated with the respective personality types. Reactors: compassionate, sensitive, and warm; great "people skills" and enjoy working with groups of people. Workaholics: responsible, logical, and organized. Persisters: conscientious, dedicated, and observant; tend to follow the rules and expect others to follow them. Dreamers: reflective, imaginative, and calm. Rebels: creative, spontaneous, and playful. Promoters: resourceful, adaptable, and charming.

These behavioral characteristics may be categorized by words, tones, gestures, postures and facial expressions, and can be observed objectively with significantly high inter-judge reliability.

Significant words may be mined within one or both of the separated first and second constituent voice data, and applies PCM to the identified words. For example, the following behavioral signifiers (i.e., words) may be associated with the corresponding behavioral type in the PCM Model TYPE BEHAVIORAL SIGNIFIERS: Reactors—Emotional Words; Workaholics—Thought Words; Persisters—Opinion Words; Dreamers—Reflection Words; Rebels—Reaction Words; Promoters—Action Words.

When a behavioral signifier is identified within the voice data, the identified behavioral signifier is executed against a system database which maintains all of the data related to the psychological behavioral model. Based on the behavioral signifiers identified in the analyzed voice data, a predetermined algorithm is used to decipher a linguistic pattern that corresponds to one or more of the PCM personality types. More specifically, the method mines for linguistic indicators (words and phrases) that reveal the underlying personality characteristics of the speaker during periods of distress. Non-linguistic indicators may also be identified to augment or confirm the selection of a style for each segment of speech. Looking at all the speech segments in conjunction with personality information the software determines an order of personality components for the caller by weighing a number of factors such as timing, position, quantity and interaction between the parties in the dialog.

The resultant behavioral assessment data is stored in a database so that it may subsequently be used to comparatively analyze against behavioral assessment data derived from analysis of the other of the first and second constituent voice data. The software considers the speech segment patterns of all parties in the dialog as a whole to refine the behavioral and distress assessment data of each party, making sure that the final distress and behavioral results are consistent with patterns that occur in human interaction. Alternatively, the raw behavioral assessment data derived from the analysis of the single voice data may be used to evaluate qualities of a single communicant (e.g., the customer or agent behavioral type, etc.). The results generated by analyzing voice data through application of a psychological behavioral model to one or both of the first and second constituent voice data can be graphically illustrated as discussed in further detail below.

It should be noted that, although one preferred embodiment of the present invention uses PCM as a linguistic-based psychological behavioral model, it is contemplated that any known linguistic-based psychological behavioral model be employed without departing from the present invention. It is also contemplated that more than one linguistic-based psychological behavioral model be used to analyze one or both of the first and second constituent voice data.

In addition to the behavioral assessment of voice data, the method of the present invention may also employ distress analysis to voice data. Linguistic-based distress analysis is preferably conducted on both the textual translation of the voice data and the audio file containing voice data. Accordingly, linguistic-based analytic tools as well as non-linguistic analytic tools may be applied to the audio file. For example, one of skill in the art may apply spectral analysis to the audio file voice data while applying a word spotting analytical tool to the text file. Linguistic-based word spotting analysis and algorithms for identifying distress can be applied to the textual translation of the communication. Preferably, the resultant distress data is stored in a database for subsequent analysis of the communication.

Figure 15:
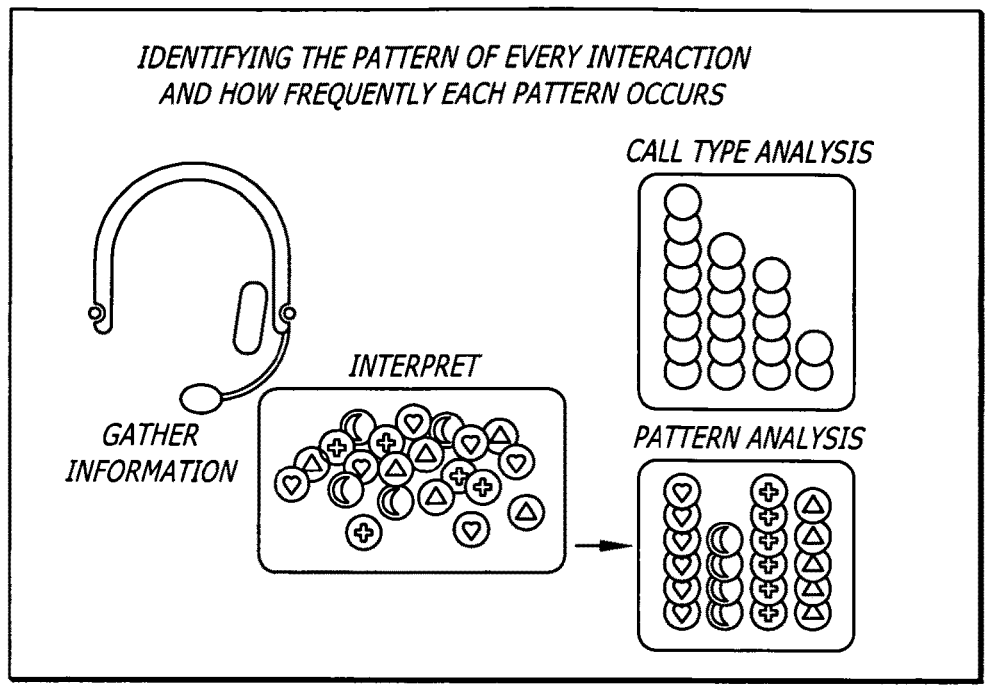
FIG. 15 is a flow diagram depicting identifying patterns in communication interactions and determining the frequency for each pattern according to an exemplary embodiment of the present invention.

FIG. 15 is a flow diagram depicting identifying patterns in communication interactions and determining the frequency for each pattern according to an exemplary embodiment of the present invention. As illustrated in the exemplary flow, information may be gathered (e.g., from voice communications between a CSR and a customer as described above, etc.). The gathered information may be interpreted, based on a set of predetermined rules or other suitable criteria. Such analysis may provide pattern matching capability, such that like objects or segments of information may be categorized into segments. Upon performing pattern analysis, the frequency of patterns appearing in telephonic communication may be ascertained. The categorization and typing analysis may allow a business or organization to determine the "outlier" or communications that are the most relevant to the business or organization, and enable the business to follow up or take action in connection with the identified calls. The call type and pattern analysis may also enable the system to direct particular exemplary calls to particular parts of an organization or business for additional review or action.

Figure 16:
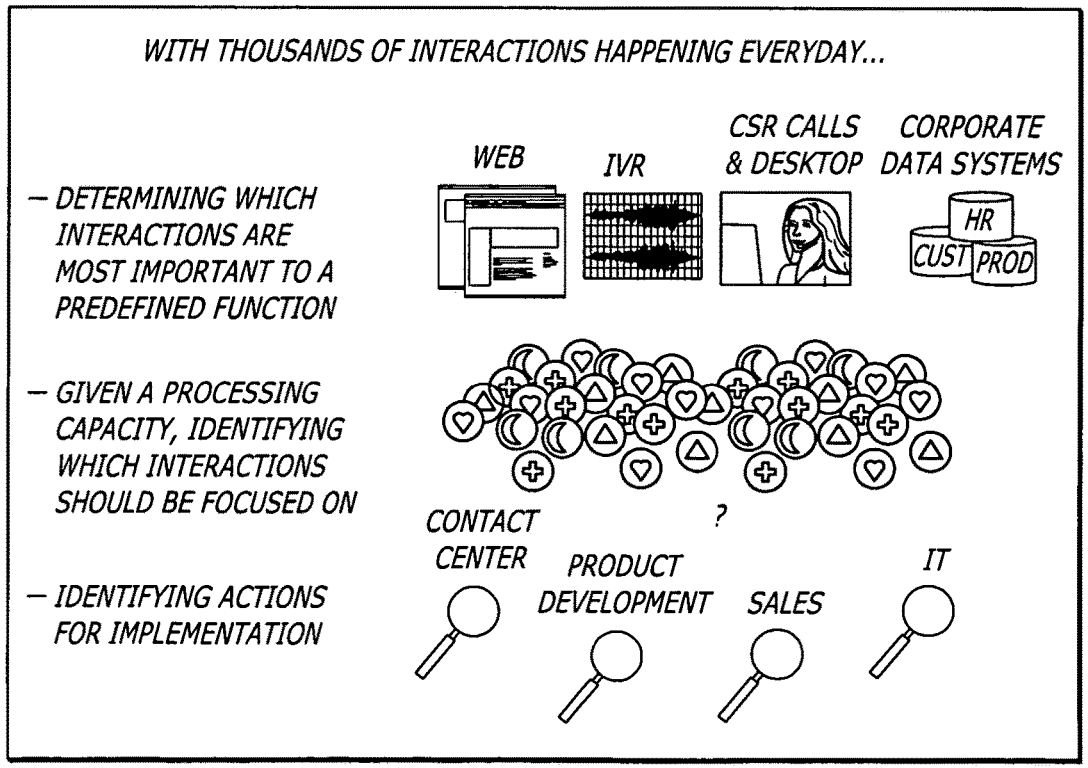
FIGS. 16-18 are flow diagrams illustrating methods for determining which communication interactions are most important, identifying interactions to be focused on, and identifying actions for implementation according to exemplary embodiments of the present invention.
Figure 17:
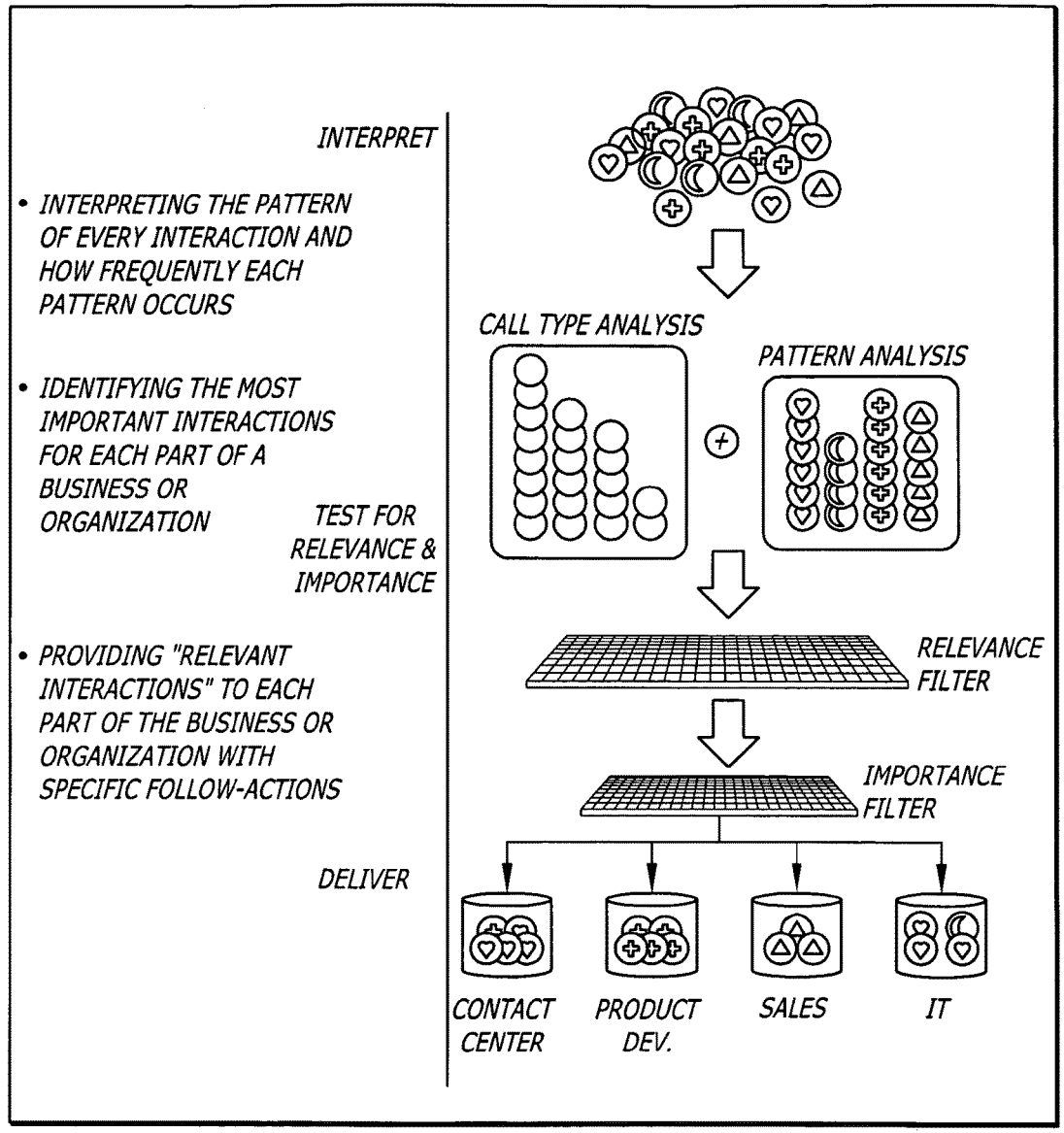
Figure 18:
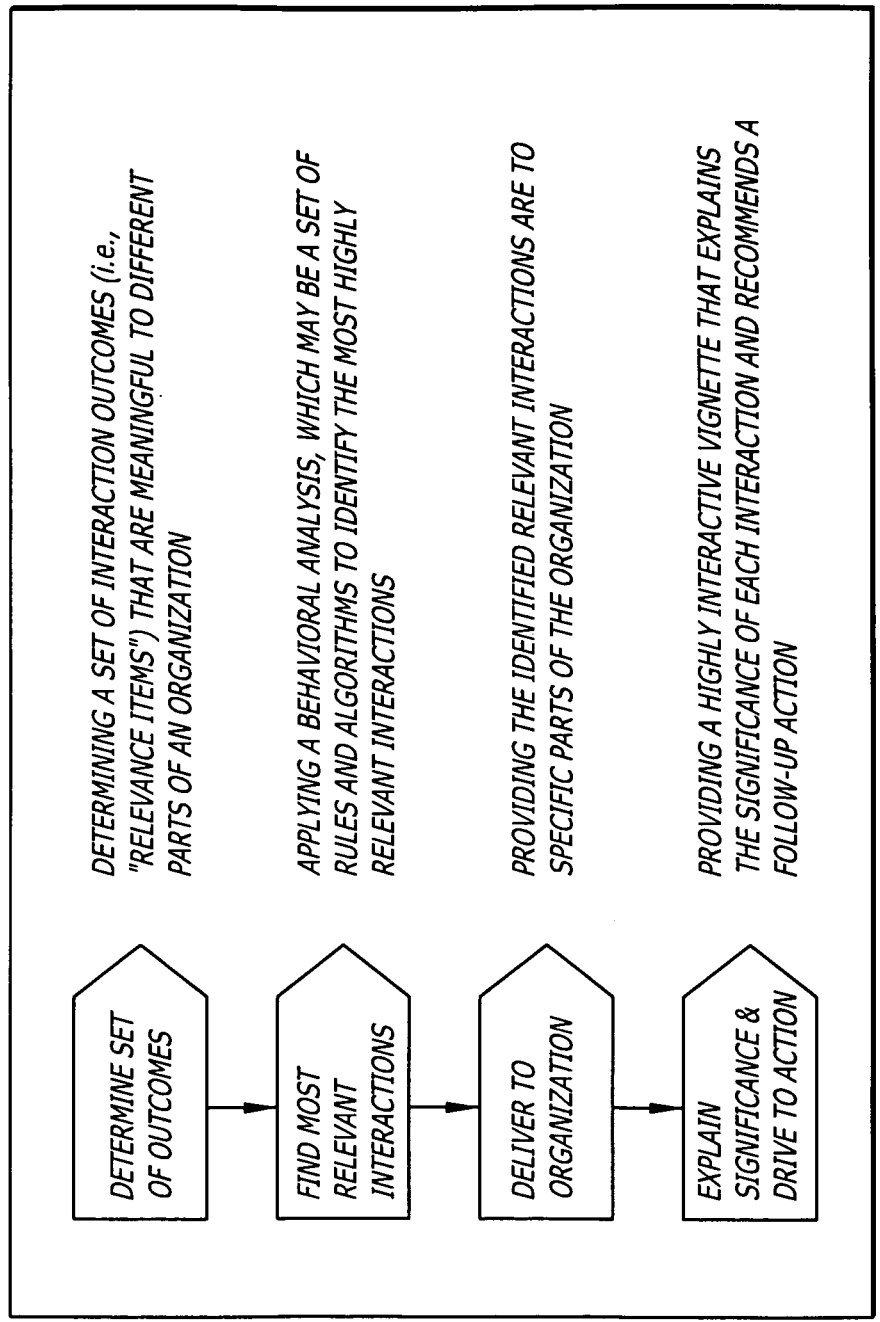

FIGS. 16-18 are flow diagrams illustrating methods for determining which communication interactions are most important, identifying interactions to be focused on, and identifying actions for implementation. As illustrated in FIG. 16, interactions between one or more customers and an organization or business may be made via a variety of different communication systems (e.g., the Web pages, IVR systems, with CSRs at call centers, databases, etc.). The systems and methods described herein determine which interactions are the most important to the function of business or organization. These business or organization functions may be predefined by a system administrator or other suitable entity. Businesses and organizations may have a given capacity to address communication activities with customers, as well as address the business and organizational functions. Thus, it is desirable to identify which interactions between a customer and a business or organization should be focused on. The systems and methods described herein may enable the identification of action for implementation by a business or organization, based on the selected interactions to focus on.

FIG. 17 depicts a flow diagram illustrating an exemplary method of call type analysis and pattern analysis. The method may interpret the pattern of selected interactions or substantially all interactions (e.g., between a customer and a CSR, etc.). The most important interactions may be identified (e.g., based on a set of predetermined rules) for some parts or each part of a business organization (e.g., contact center, product development, sales, etc.). The systems and methods described herein may provide "relevant interactions" to parts or to each part of the business or organization. These relevant interactions may be accompanied by specific actions for the part of the business or organization to take.

FIG. 18 depicts a flow diagram illustrating the application of behavioral analysis (as described herein) in order to determine the most relevant items of communications to a business or organization. A set of interaction outcomes (i.e., relevance items, for example, as identified in FIG. 19) may be determined that have been identified as being meaningful to one or more parts of a business or organization. Behavioral analysis may be applied to the set of interactions. Behavioral analysis may be a predefined set of rules to identify the most relevant interactions based on the applied rules. The identified relevant interactions may be directed to one or more portions of an organization for review and/or further action. Additionally, an interactive vignette (e.g., an audio-visual presentation) may accompany the identified relevant interactions in order to explain the business or organizational significance of each interaction, as well as provide one or more recommended follow-up actions.

Figure 20:
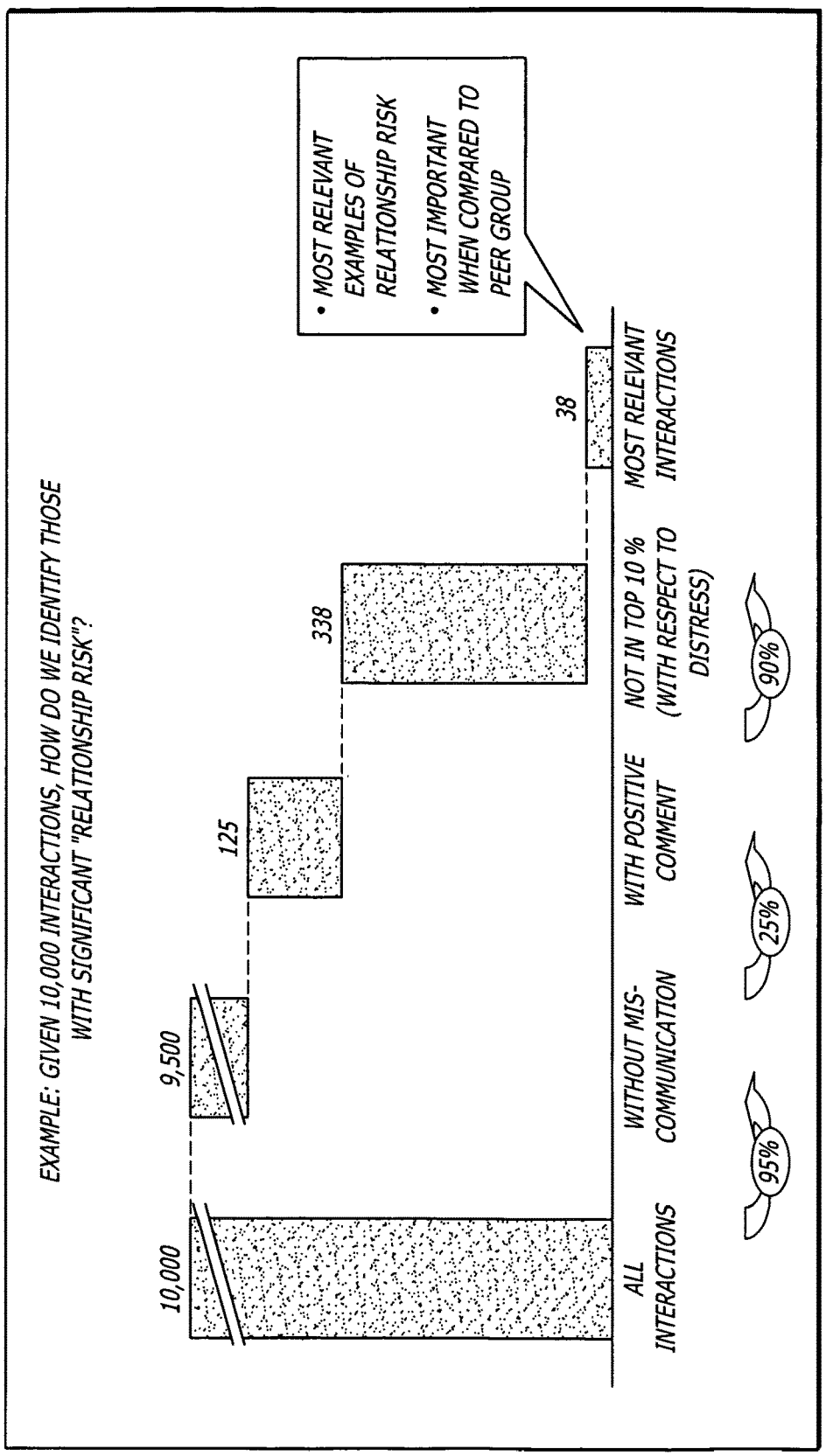
FIG. 20 is a chart depicting an example of identifying a relevant interaction that relates to a "relationship risk"

FIG. 20 illustrates an example of determining a relevant interaction. Given 10,000 interactions, the interactions having a significant "relationship risk" may be identified. Upon starting with the initial 10,000 interactions, 9,500 interactions may be discounted, as they do not have segments of the interaction typed as (i.e., classified as) miscommunication events. From the 500 remaining interactions, only 25% (i.e., 125 interactions) may have a segment of the interaction typed as positive comment. The resulting 375 interactions may be evaluated to determine whether they are within the top 10% with respect to distress. Thus, 38 interactions (i.e., approximately 10% of 375 interactions) may be determined as the most relevant interactions for a relationship risk and most important when compared to a peer group of interactions.

Figure 21:
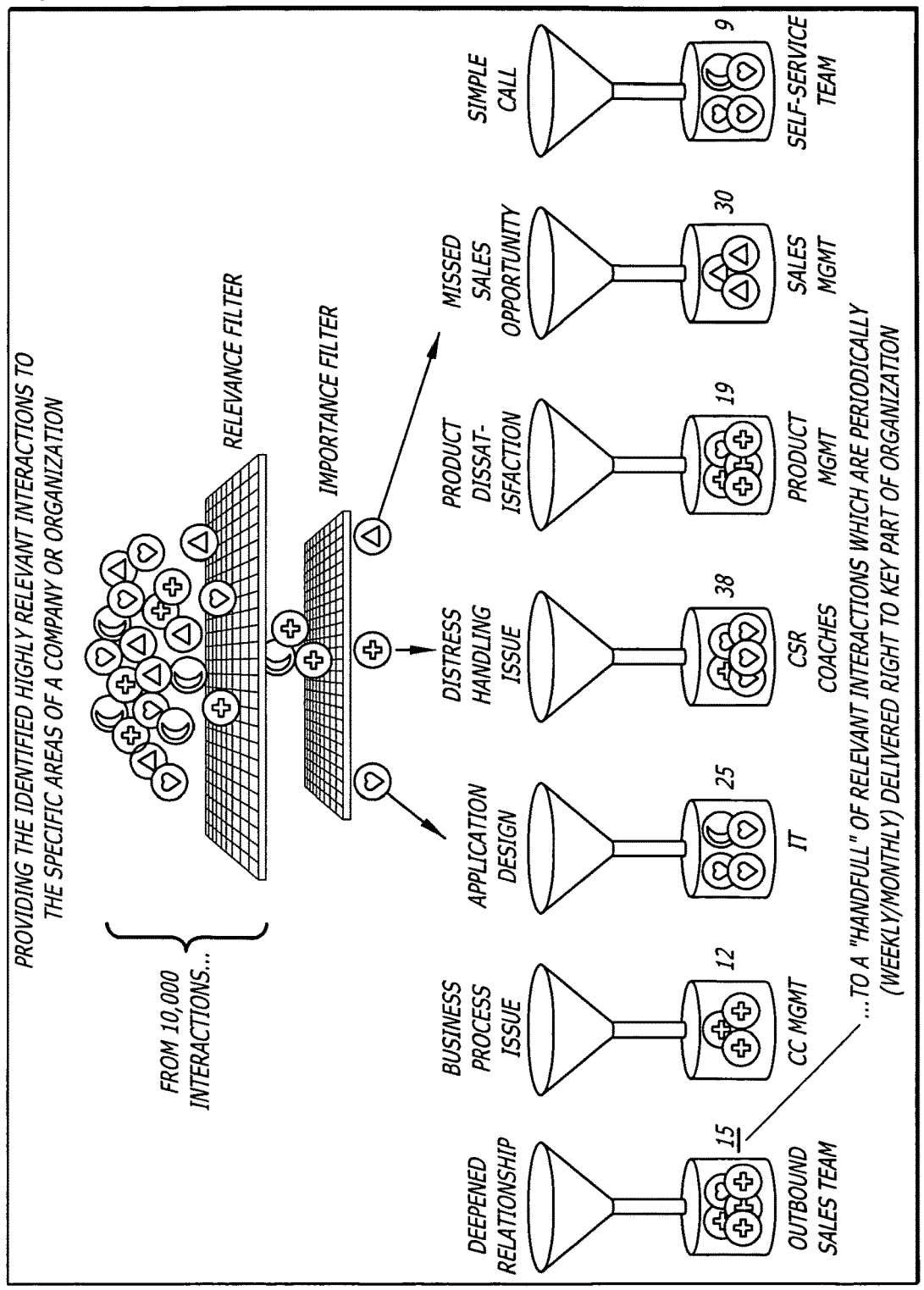
FIG. 21 illustrates a flow diagram depicting providing the identified highly relevant interactions to specific areas of a company or organization according to an exemplary embodiment of the present invention.

FIG. 21 illustrates a flow diagram depicting providing the identified highly relevant interactions to specific areas of a company or organization according to an exemplary embodiment of the present invention. Using the example from FIG. 20, the 10,000 interactions may be filtered with a relevance filter and an importance filter, with each filter having a set of predetermined rules for filtering. In the example of FIG. 21, interactions may be filtered to different areas of a business organization (e.g., outbound sales team, management, Information Technology, CSR coaches, product management, sales management, sales service team, etc.) based on relevance items (e.g., deepened relationship, business process issue, application design, distress handling issue, product dissatisfaction, missed sales opportunity, simple call, or any relevance item listed in FIG. 19, or any other suitable relevance item). FIGS. 22-23 are tables that provide exemplary relevance items for a company or organization. Turning again to FIG. 21, from the 10,000 interactions in this example, 15 interactions related to deepened relationship were directed to the outbound sales team for review and follow-up. These relevant interactions may be delivered to the appropriate section of a business or organization on a periodic basis (e.g., daily, weekly, monthly, yearly, etc.).

Figure 24:
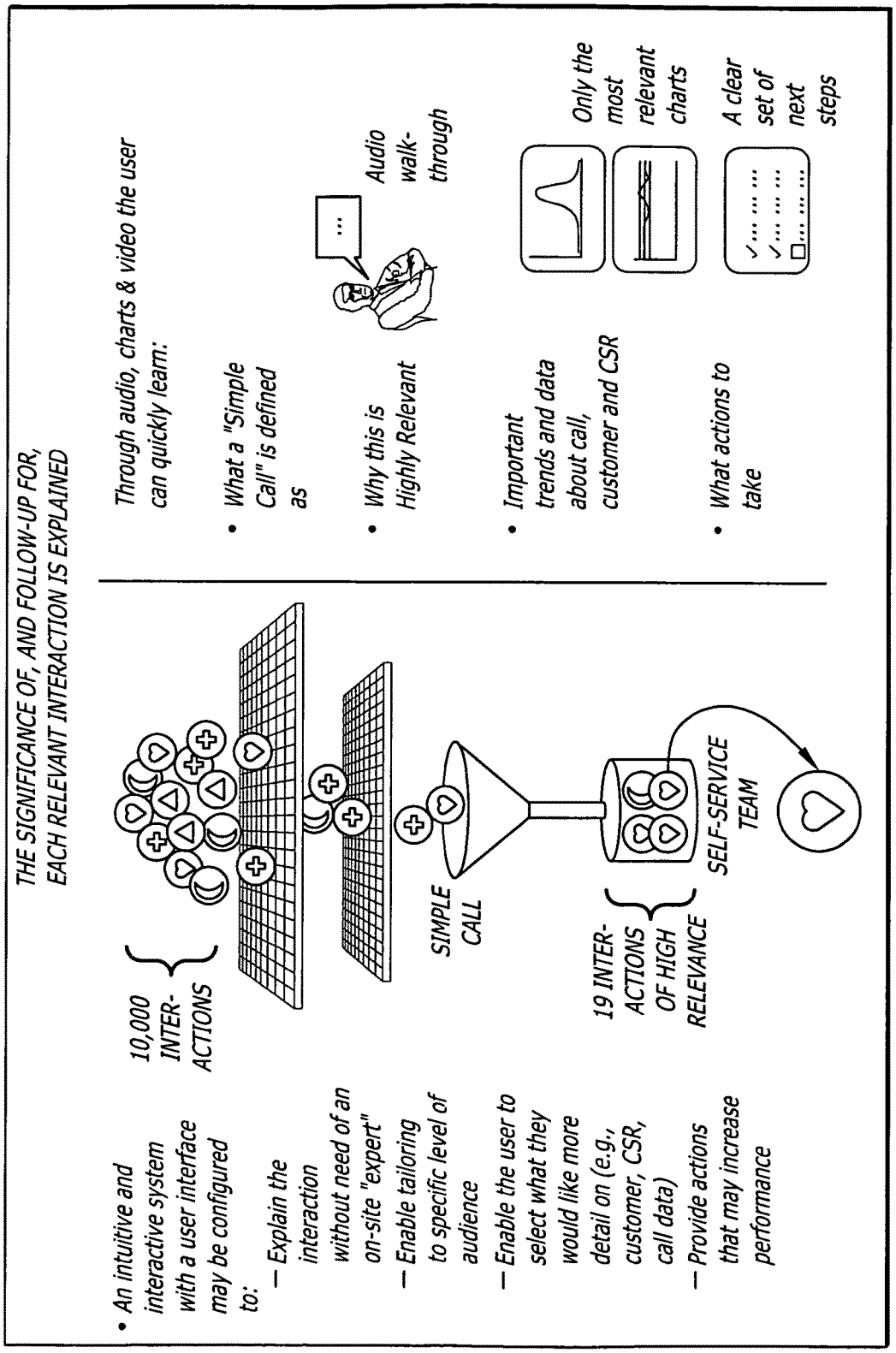
FIG. 24 is a chart indicating that the significance of each identified relevant interaction may be explained to one or more users according to an exemplary embodiment of the present invention.

FIG. 24 is a graphical representation showing that the significance of each relevant interaction is explained to a user according to an exemplary embodiment of the present invention. As depicted, the 10,000 interactions may be processed to determine which are "simple calls" based on a set of predefined rules. Of the 10,000 interactions in this example, 19 interactions may be determined as being highly relevant to simple calls. These relevant interactions may be directed to, for example, a self-service team for review and follow-up. The systems and methods described herein are provide an intuitive and interactive user interface (e.g., as illustrated in FIGS. 28-34) configured to explain the interaction without the need for an on-site expert. The user interface is enabled to be tailored to a specific audience level (e.g., managers, instructors, etc.). The user interface may enable the user to select what they would like to view more detail on (e.g., the customer, the CSR, the call data, etc.), and provide recommended actions for follow-up. For example, audio-type presentations, video-type presentations, audio-video presentations, charts, and text may enable a user to, for example, determine: what a "simple call" is defined as; why the identified interactions for simple calls are highly relevant to the business; important trends and data about the call, customer, and/or CSR; and what actions to take (e.g., a set of next-steps), etc.

FIGS. 25-26 illustrate tables that indicate relevance items (e.g., relationship risk, positive turnaround, etc.), personnel of a business or organization (e.g., account/retention team, customer center management, etc.) that should be notified of the relevant item, and follow-up actions associated with the relevance items according to an exemplary embodiment of the present invention.

Figure 19:
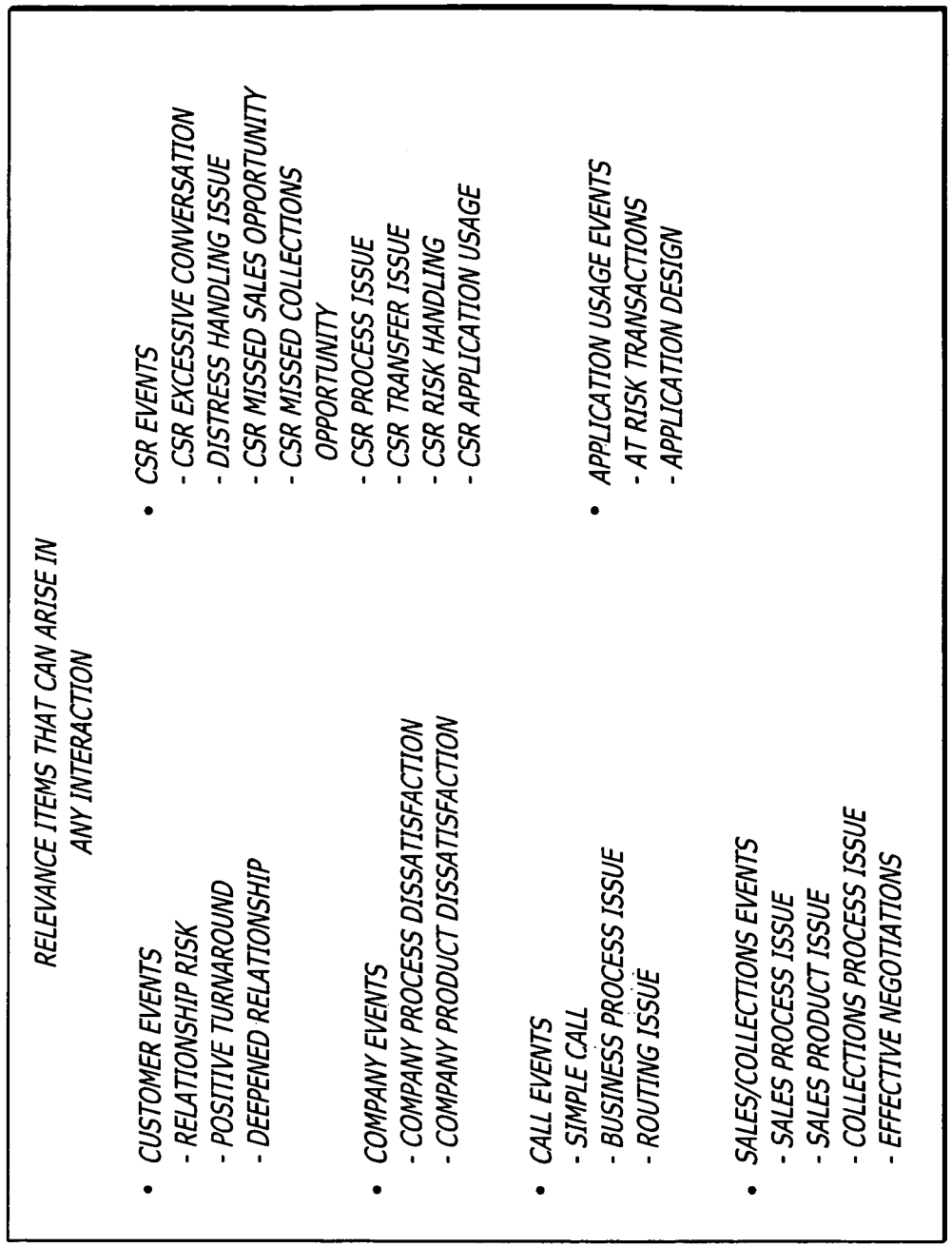
FIG. 19 illustrates a table depicting relevance items that may arise in interactions according to an exemplary embodiment of the present invention.
Figure 27:
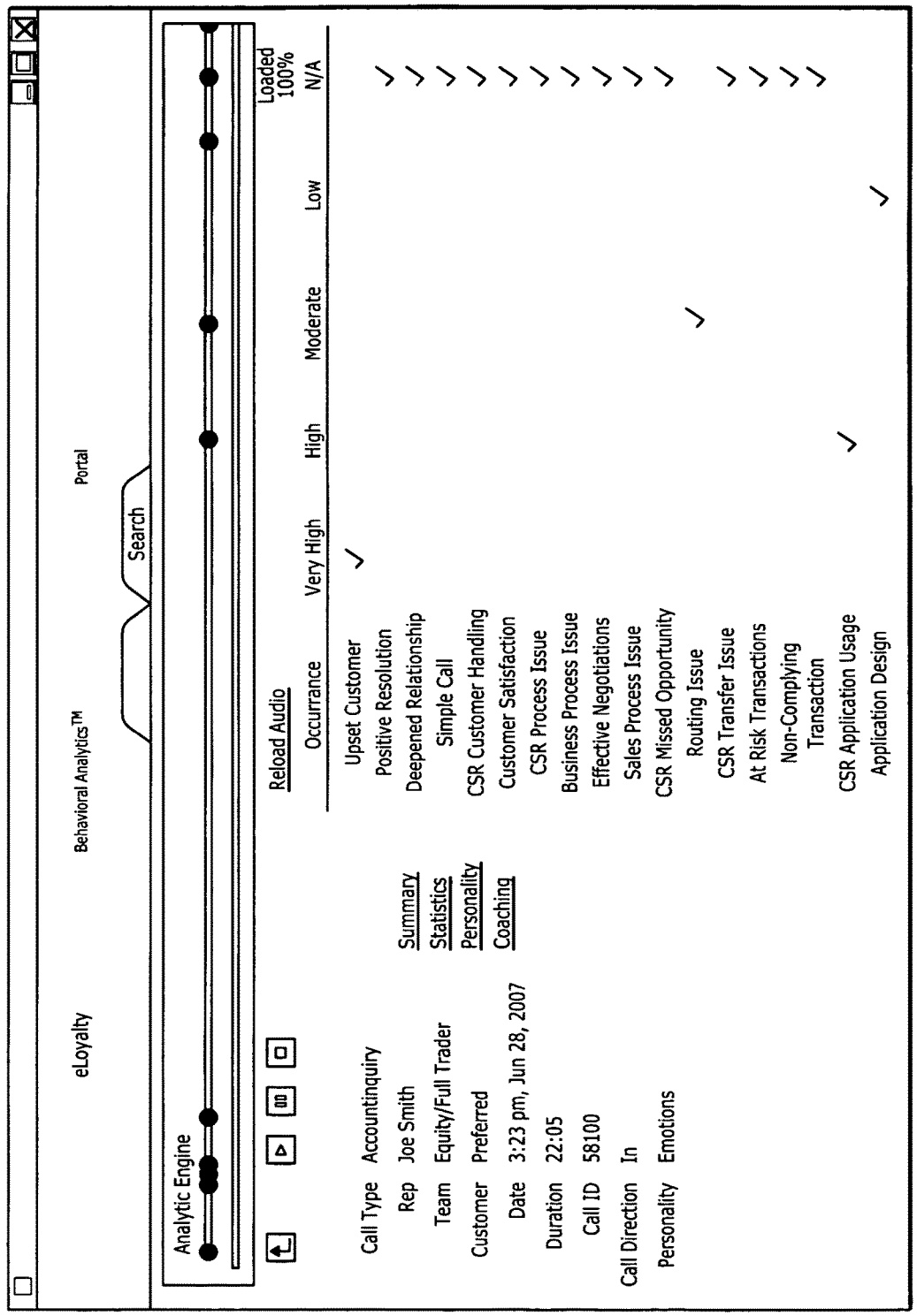
FIG. 27 illustrates an exemplary graphical user interface (GUI) depicting an exemplary telephonic communication and its business relevance according to various relevance items.

FIG. 27 illustrates an exemplary graphical user interface (GUI) depicting an exemplary telephonic communication and its business relevance according to various relevance items (e.g., relevance items identified in FIG. 19 and FIGS. 22-23). The top portion of the display illustrates a linear representation of a telephonic communication between a customer and a CSR, with distress events identified at particular times in the represented communication (i.e., circles). Below this representation is a linear representation of the computer applications in use by the CSR during the duration of the telephonic conversation. FIG. 27 also depicts details related to the telephonic conversation including, but not limited to: call type (e.g., account inquiry, sales, collections, etc.), CSR name, CSR's team, customer type, date, call duration, call identification number, call direction (e.g., incoming, outgoing, etc.), or the personality type of the customer and/or CSR, or any other suitable information. As noted above, FIG. 27 also illustrates a chart depicting the relevance items, and the frequency of the occurrence of the relevance item in the telephonic communication. As shown, the frequencies for the relevance items may be "very high", "high", "moderate", "low", or "N/A" (not applicable). For example, a call having a relevance item that is indicated as being very high may be in about the top 10% for selected calls or substantially all calls. Relevance items indicated as "high" may be in about the next 15% of selected calls substantially all calls, those indicated as "moderate" may be in about the next 25% of selected calls or substantially all calls, and those indicated as "low" may be in about the next 50% of selected calls or substantially all calls. The "N/A" category is indicated when no segment of the telephonic communication applied to one of the relevance items or other predefined rules. In the example depicted in FIG. 27, the call was presented as being "business relevant" as it received a "very high" rating for the "upset customer" relevance items. Using the GUI depicted in FIG. 27, a user may play back the audio for the telephonic conversation either in whole or in selected parts (e.g., during the identified customer distress moments).

FIGS. 28-34 illustrates a GUI (i.e., business relevance dashboard) depicting the most relevant telephonic communications. More specifically, these exemplary figures illustrate customer events that represent business relationship risks to a company or organization over a predetermined period of time (e.g., one week, three months, six months, one year, etc.).

Figure 28:
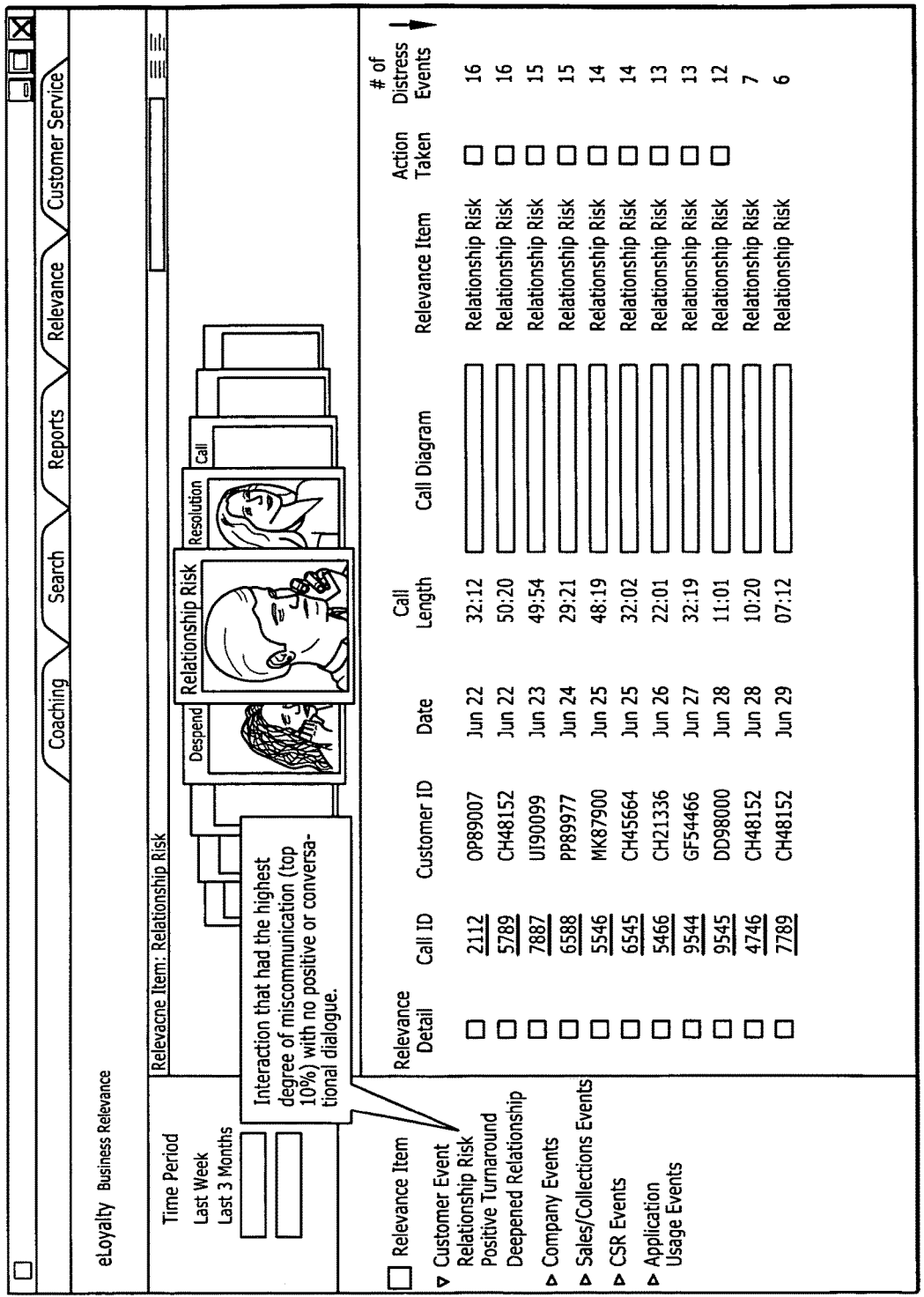
FIG. 28 illustrates a GUI depicting the most relevant telephonic communications that represent business relationship risks to a company over a predetermined period of time.

FIG. 28 illustrates an exemplary GUI display that presents a table of highly relevant telephonic communications that represent relationship risks for the company or organization based on the number of distress events identified in the communications. The relationship risk calls identified in this display may, for example, represent calls that may have had the highest instances of miscommunication with no positive or conversational dialogue (e.g., after processing the voice data of a call in the manner shown in FIGS. 8-14, as described above). The GUI may provide such information including, but not limited to: call identification number, customer identification number, date of the call, call length, the relevance item category (e.g., relationship risk, etc.), whether an action has been taken in response to the communication, the number of distress event, a diagram of the call, or other call relevance details, or any combination thereof.

Figure 29:
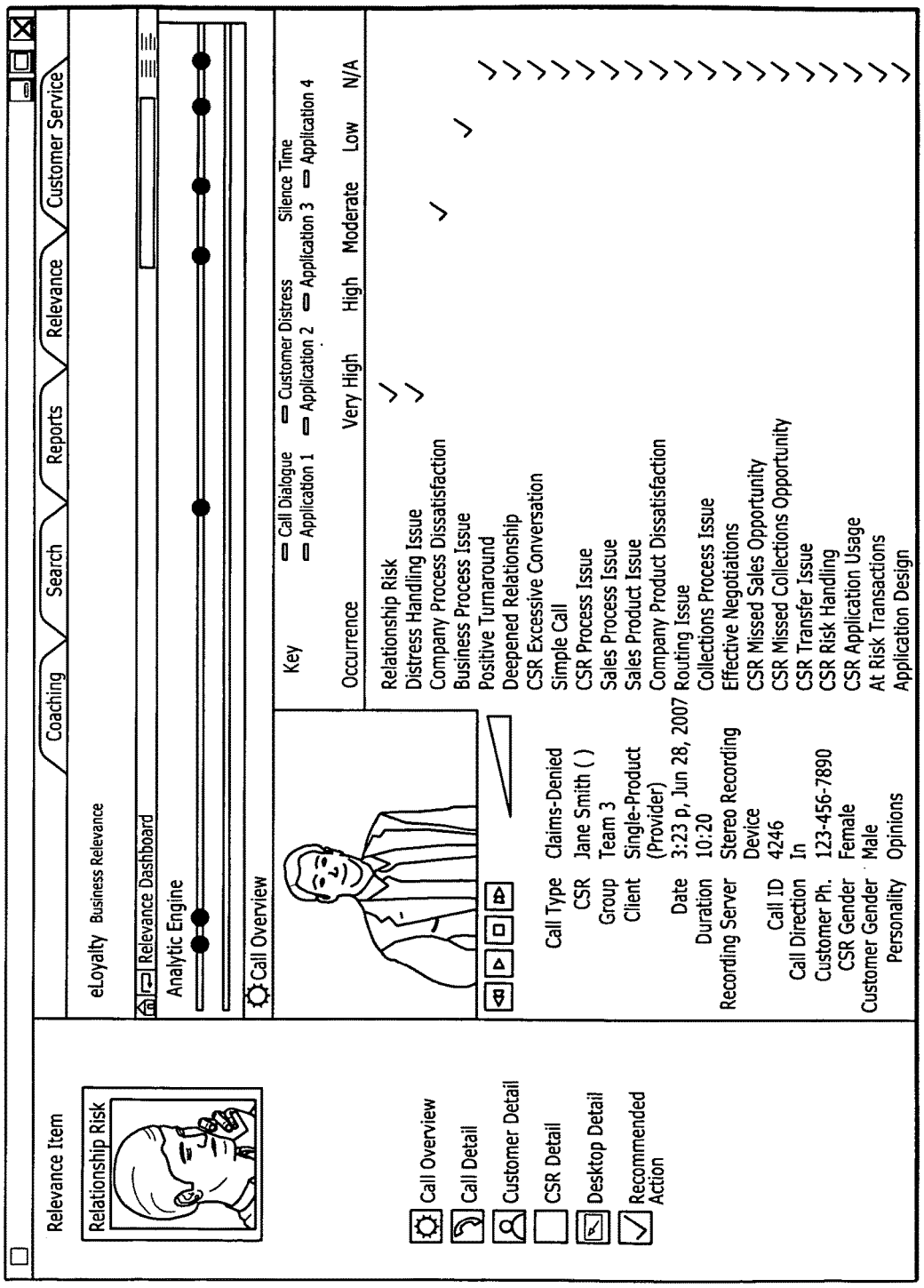
FIG. 29 illustrates a GUI depicting call overview information indicating the occurrence of relevance items in a telephonic communication.

FIG. 29 illustrates an exemplary GUI related to a call overview for calls selected from the calls identified in FIG. 28 as posing a relationship risk. Similar to FIG. 27, FIG. 29 provides a linear representation of a call, indicating portions of distress, and may have a linear representation of the computer applications used by the CSR during the call below. The call overview GUI may provide such information as the call type (e.g., claims—denied), the CSR name, the CSR's group, the client, the date of the call, the duration of the call, the recording server (e.g., stereo recording, mono VoIP recording, etc.), call identification number, the call direction (i.e., in-bound call or out-bound call), the customer phone number, the gender of the CSR, the gender of the customer, or the personality type of the customer, or any combination thereof, or any other suitable information. FIG. 29 may have a table similar to that which is depicted in FIG. 27, that indicates the relevance items and their frequency of appearance in the selected call as related to a subset of calls or substantially all calls. For example, the depicted table associated with the selected call indicates that the call has a "very high" relationship risk and distress handling issues. FIG. 29 also illustrates an audio-visual display window, wherein a user may select for playback an audio-visual presentation that provides a summary of the information provided textually in the GUI display, and explains its importance and business relevance.

Figure 30:
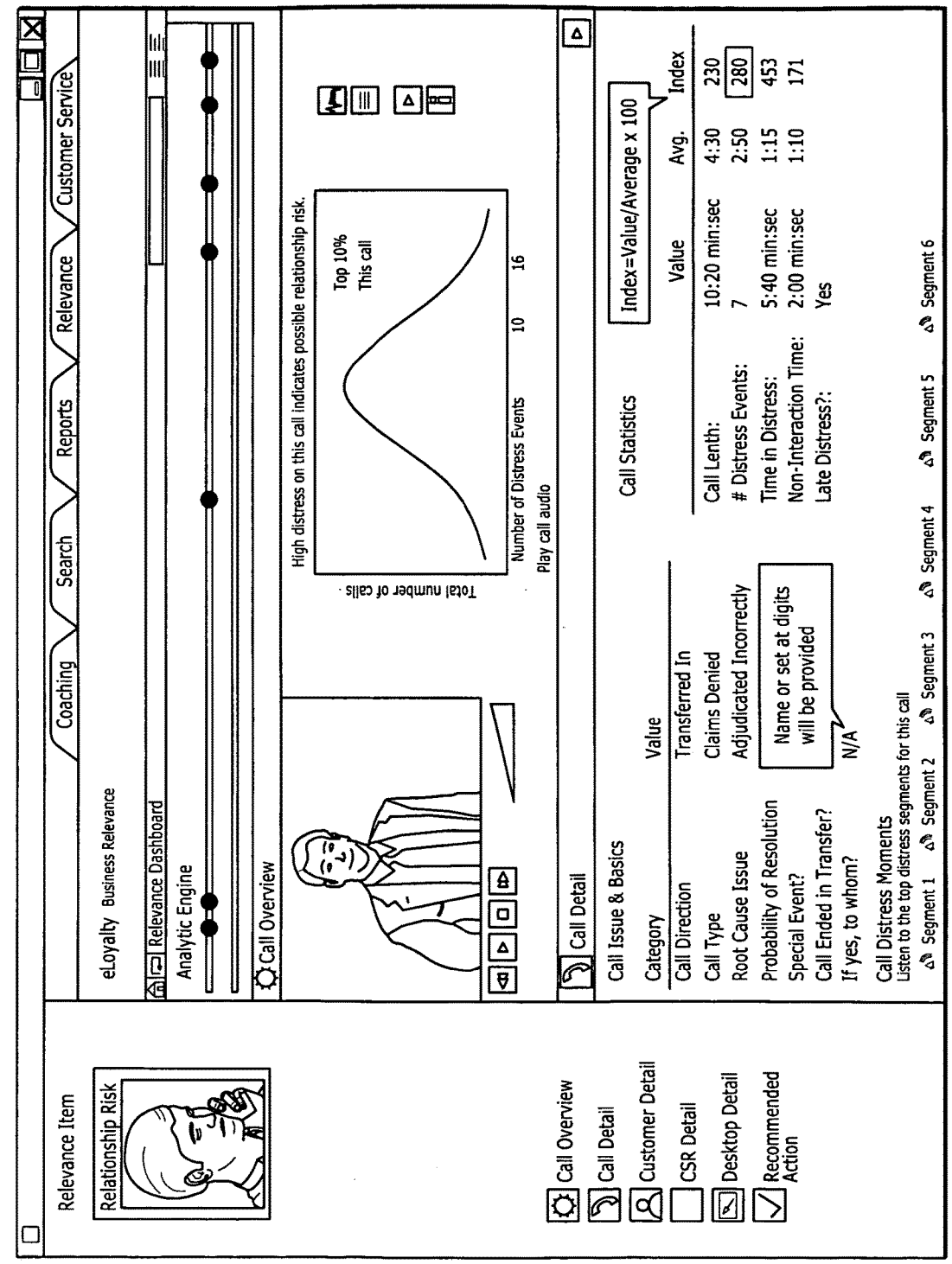
FIG. 30 illustrates a GUI depicting detailed call information, including call issue, call statistics, and call distress moments.

FIG. 30 illustrates a GUI display that provides additional details related to the selected call. Again, as in FIG. 29, linear representation of the call and the application software used by the CSR are provided to the user. Also provided is a graph indicating, for example, the number of stress events versus the total number of calls received by the call center over a particular interval of time. As indicated by the exemplary graph, the selected call had sixteen distress events, which places the call within the top 10% of all calls (as the top 10% has ten or more distress events). FIG. 30 also depicts information about the call issue and other basic information related to the call (e.g., call directions, call type, root cause issue (e.g., adjudicated incorrectly), probability of resolution, etc.). Also depicted are call statistics, where the individually selected call statistics are compared against a subset of calls or substantially all calls over a predetermined time period. This subset of calls or substantially all call may provide the data to form the average values to which the selected calls are compared. For example, call statistics may include the call length, distress events, time in distress, non-interaction time, or late distress, or any combination thereof, or any other suitable information. The index value may also be provided, and the index value may be computed by dividing the value for the selected call by the average value multiplied by 100 (i.e., index=value/(average×100). Also provided in the GUI display of FIG. 30 are individual call segments (e.g., segments 1-6) where a user may listen to the individual distress segments of the call. Additionally, the GUI display of FIG. 30 may provide an audio-visual presentation that a user may play back which summarizes the textual data provided to the user, as well as explains its importance and business relevance.

Figure 31:
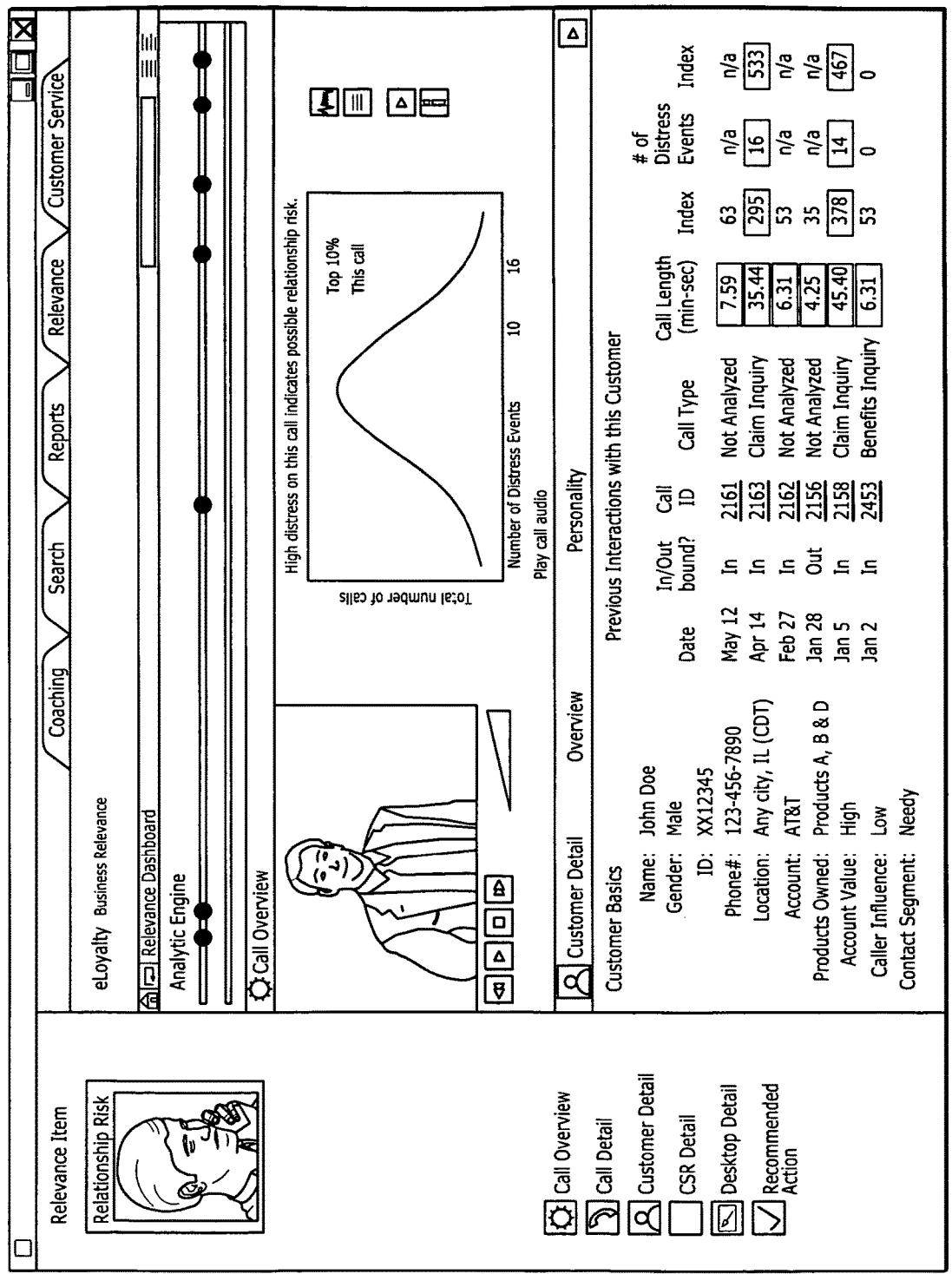
FIG. 31 illustrates a GUI depicting customer details for the call, as well as previous interactions with the customer.

FIG. 31 illustrates a customer detail GUI display screen, which may provide detailed customer information such as the customer name, gender, customer identification number, customer phone number, customer location, the account, the products owned by the customer, the account value, the caller influence, or a contact segment (e.g., "needy," etc.), or any other suitable information. Upon selection, further detail may be provided to the user regarding the customer's personality type. Also provided in the display screen illustrated in FIG. 31 are selected previous interactions with the customer or substantially all previous interactions. This information may include the date of the call, call type, length of the call, number of distress events, the call identification number, any combination thereof, or any other suitable information. The GUI display may have an audio-visual presentation that provides a summary of the textual and graphical information presented to the user, and provides further information as to the importance and business relevance of the call.

Figure 32:
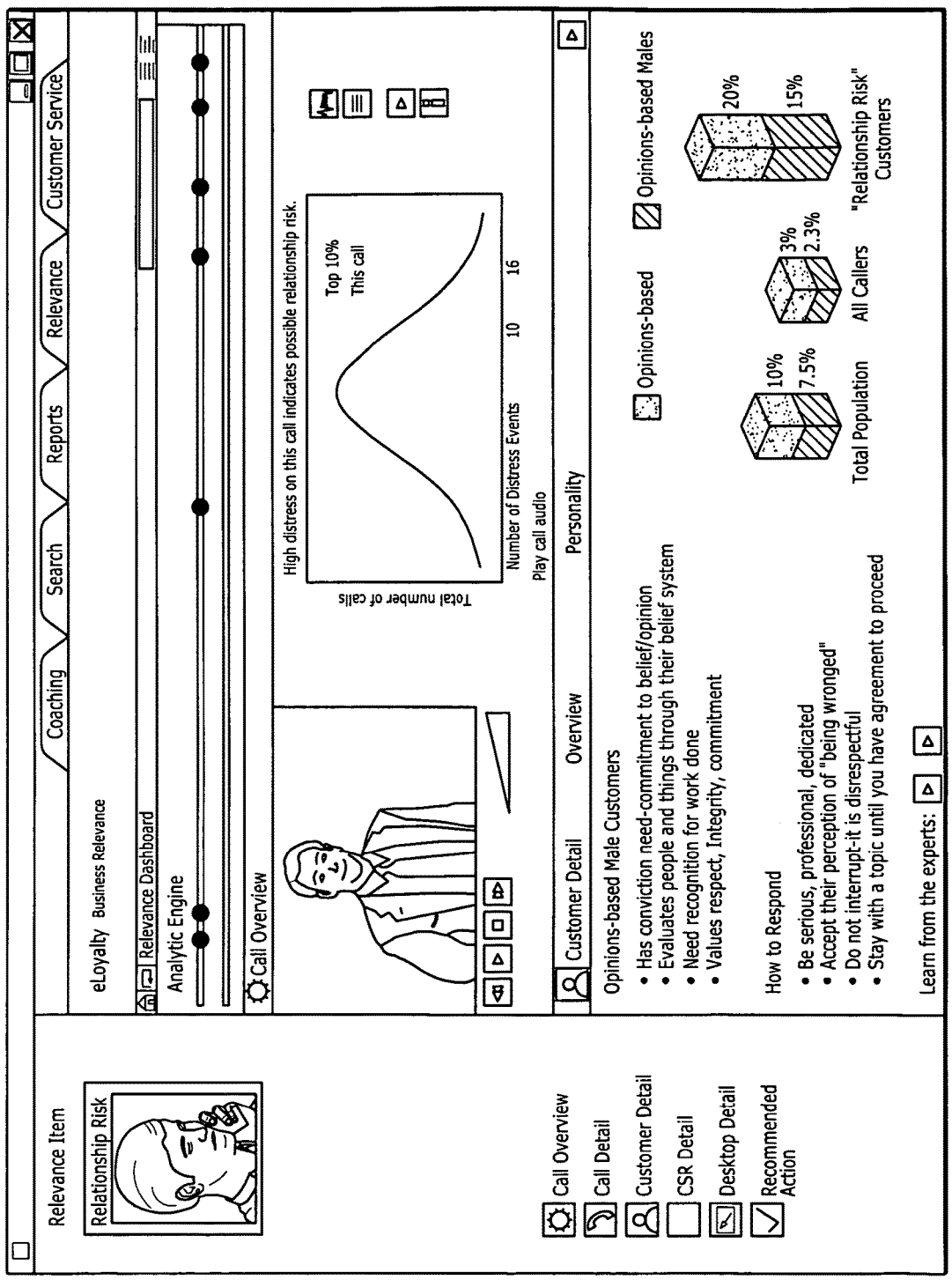
FIG. 32 illustrates a GUI depicting additional customer details, such as the personality type of the customer and how CSRs should respond to such customers given their personality type.

FIG. 32 illustrates a customer detail GUI display related to customer personality. In the exemplary display, the customer has been classified as an opinions-based male customer. The GUI provides information related to this classification, such as the characteristics of an opinion-based male. Also provided are suggestions to a user as to how to respond to such customers with this identified personality type. The GUI display of FIG. 32 also depicts a graph indicating the percentages of opinions-based personalities in the total population, the (e.g., the total population of received calls where the personality type of the customer has been identified), the user may also select to play an audio-visual presentation that provides a summary of the textual and graphical information presented to the user, and provides further information as to the importance and business relevance of the call.

Figure 33:
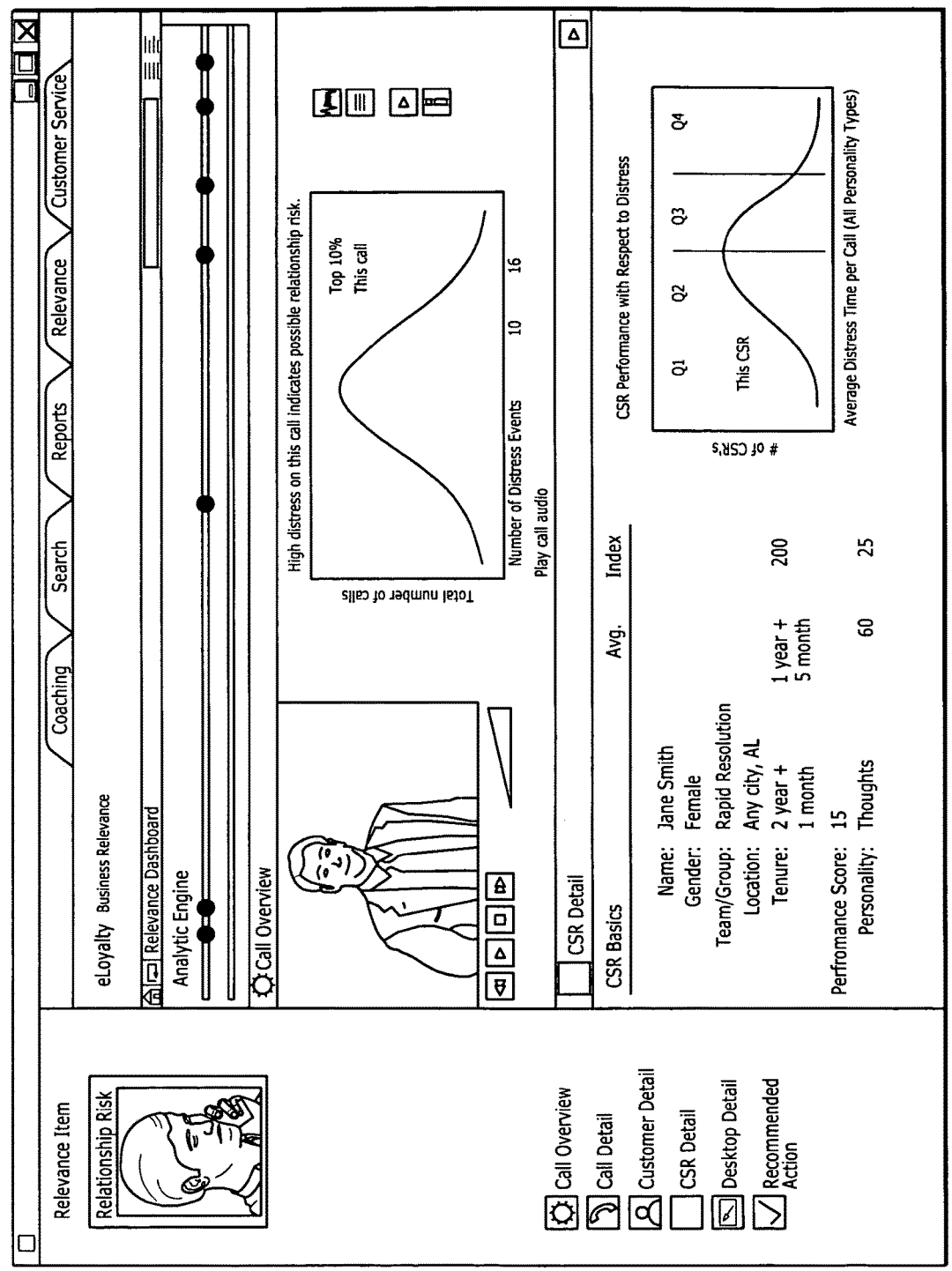
FIG. 33 illustrates a GUI depicting details related to the CSR, including the CSRs past performance related to distress events per call.

FIG. 33 illustrates a GUI display that provides information related to the CSR who attended to the selected call. The display may provide details related to the CSR, including, but not limited to: name, gender, team affiliation, location, tenure, performance score, or personality type, or any combination thereof, or any other suitable information. As illustrated in the exemplary display, a graph may depict the performance of the CSR with respect to a performance metric (e.g., distress, etc.). For example, the number of CSRs may be compared to the average distress time per call (e.g., for all personality types). In this example, this CSR has a low average distress time per call compared to other CSRs. Again, the GUI display may have an audio-visual presentation that provides a summary of the textual and graphical information presented to the user, and provides further information as to the importance and business relevance of the call.

Figure 34:
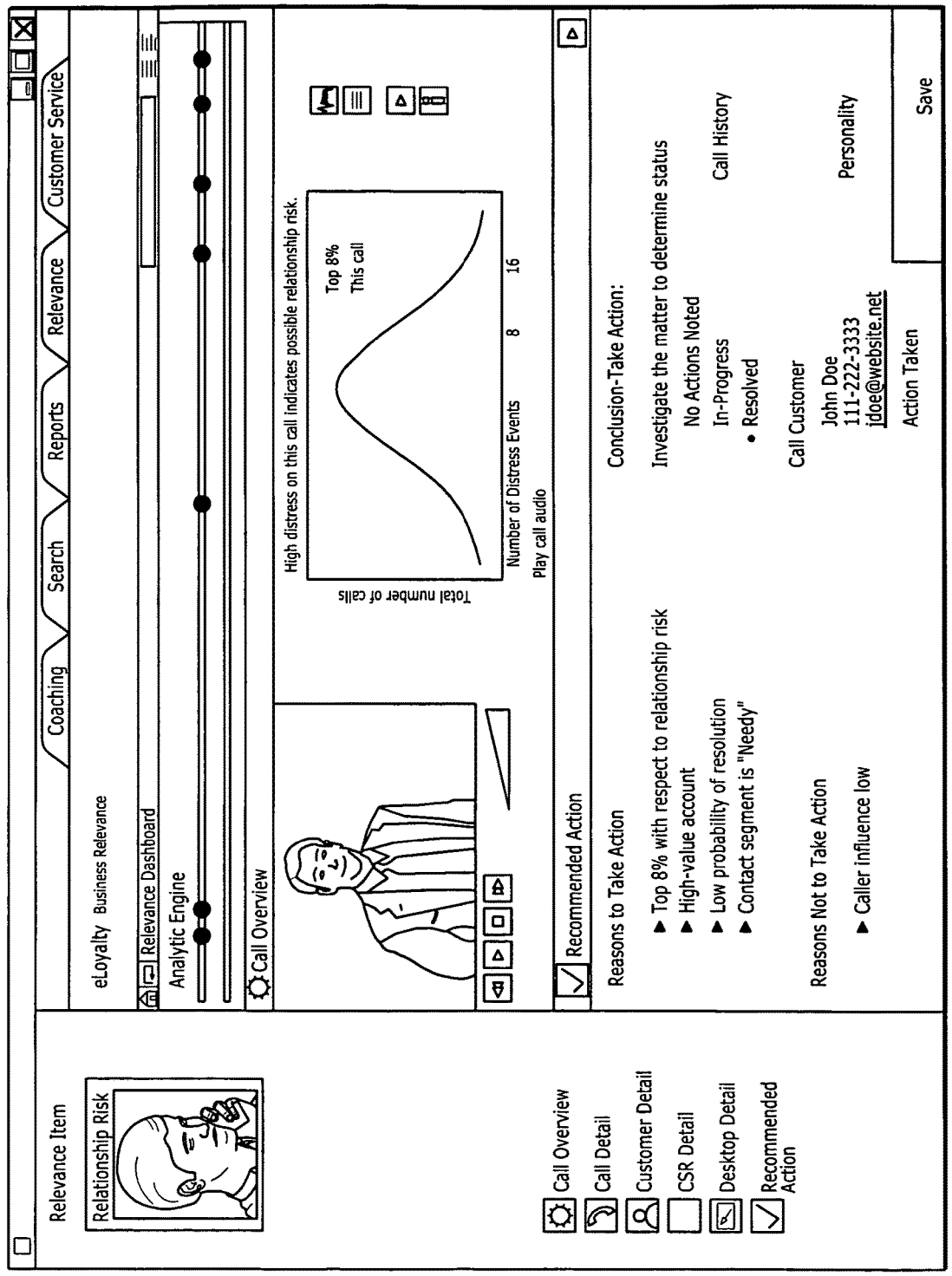
FIG. 34 illustrates a GUI depicting recommended actions for the identified relevant call.

FIG. 34 illustrates GUI display that provides recommended action. The recommended action may be related to the relevance item (e.g., relationship risk, etc.). The GUI display may provide, for example, one or more reasons that may be business related for taking additional action with respect to the call. In the illustrated example, the call was within the top 8% with respect to relationship risk, it was a high value account, the contact segment was identified as "needy", etc. The GUI display may provide reasons for not taking additional action, e.g., the caller influence was low. The system may weigh the reasons for taking action against the reasons not to take action, and may provide a recommendation as to whether to proceed with taking action. In the illustrated example, action was recommended, and the contact information of the customer may be provided so that they may be contacted. Comments may be added by the user after action has been taken.

While the specific embodiments have been illustrated and described, numerous modifications come to mind without significantly departing from the spirit of the invention and the scope of protection is only limited by the scope of the accompanying Claims.

What is claimed is:

1. A node comprising:
    a processor; and
    a non-transitory computer readable medium operably coupled thereto, which includes logic adapted to analyze a plurality of electronic communications between one or more customers of an organization and agents of a contact center comprising:
        instructions that, when executed, apply linguistic analysis to each electronic communication that occurs over a first predetermined time period to identify segments including words related to business or non-business categories within each electronic communication;
        instructions, that when executed, apply non-linguistic analysis to each electronic communication that occurs over the first predetermined time period, wherein the non-linguistic analysis includes at least one of a timing of each segment of each electronic communication, a determination of a position of each segment within each electronic communication, a determination of a quantity of each segment within each electronic communication, and a determination of an interaction between the one or more customers and agents within each electronic segment;
        instructions that, when executed, identify a pattern in each electronic communication based on the linguistic analysis and the non-linguistic analysis over the first predetermined time period;
        instructions that, when executed, determine a frequency for the pattern in each electronic communication over the first predetermined time period;
        instructions that, when executed, identify a first subset of communications from the plurality of electronic communications that are relevant based on the identified pattern and the determined frequency for the pattern over the first predetermined time period;
        instructions that, when executed, identify a second subset of communications that exhibit distress from the first subset of communications;
        instructions that, when executed, identify a trend in the second subset of communications over the first predetermined time period based on the determined frequency for the pattern and presence of distress;
        instructions that, when executed, display the identified trend on a graphical user interface; and
        instructions that, when executed, transmit the second subset of communications to relevant personnel of the organization, the second subset of communications being the most relevant communications relative to the plurality of electronic communications.

2. The node of claim 1, wherein the logic further comprises:
    instructions that, when executed, identify a pattern in each electronic communication that occurs over a second predetermined time period;
    instructions that, when executed, determine a frequency for the pattern in each electronic communication over the second predetermined time period;
    instructions that, when executed, identify a subset of communications from the plurality of electronic communications that are relevant based on the identified pattern and the determined frequency over the second predetermined time period; and
    instructions that, when executed, identify a trend in the subset of communications over the second predetermined time period.

3. The node of claim 2, wherein the first and second predetermined time periods are sequential and do not overlap.

4. The node of claim 2, wherein the logic further comprises instructions, that when executed, generate a recommended action based on a comparison of a first plurality of identified patterns from the first predetermined time period to a second plurality of identified patterns from the second predetermined time period.

5. The node of claim 4, wherein the logic further comprises instructions, that when executed, transmit the recommended action to a communication distributor.

6. The node of claim 1, wherein the instructions that, when executed, identify the pattern comprise instructions, that when executed, establish a frequency threshold, and include a pattern that exceeds the frequency threshold in the identified pattern.

7. The node of claim 1, which further comprises a routing engine configured to send an automated message to an external source based on the identified trend.

8. The node of claim 1, wherein the logic further comprises at least one of:
    instructions that, when executed, determine how relevant each electronic communication is to different areas of a business organization using a relevance filter, and
    instructions that, when executed, determine how important each electronic communication is to different areas of a business organization using an importance filter.

9. The node of claim 8, wherein the logic further comprises instructions that, when executed, generate an interactive vignette to accompany identified relevant and identified important electronic communications.

10. The node of claim 1, wherein the logic further comprises:
    instructions that, when executed, identify a linguistic behavioral signifier of at least one of the one or more customers and agents;
    instructions that, when executed, compare the identified linguistic behavioral signifier to a database including a plurality of behavioral signifiers;
    instructions that, when executed, apply a predetermined algorithm to the identified linguistic behavioral signifier; and
    instructions that, when executed, determine a personality type associated with the identified linguistic behavioral signifier based on the comparison of the identified linguistic behavioral signifier to the database of behavioral signifiers and the application of the predetermined algorithm to the identified linguistic behavioral signifier.

11. The node of claim 1, wherein the logic further comprises:
    instructions that, when executed, categorize each electronic communication as a type of communication.

12. The node of claim 11, wherein the type of communication is one of a service type communication, a retention type communication, and a sales type communication.

13. The node of claim 1, wherein the non-linguistic analysis further comprises a spectral analysis of an audio waveform of each electronic communication.

14. A computer-implemented method for analyzing electronic communications between one or more customers of an organization and a contact center having one or more agents, the method being implemented by a non-transitory computer readable medium adapted to control a computer and comprising a plurality of code segments, the method comprising:
  recording a plurality of electronic communications;
  applying linguistic analysis to each recorded electronic communication that occurs over a first predetermined time period to identify segments including words related to business or nonbusiness categories within each electronic communication;
  applying non-linguistic analysis to each electronic communication that occurs over the first predetermined time period, wherein the non-linguistic analysis includes at least one of timing of each segment of each electronic communication, determining a position of each segment within each electronic communication, determining a quantity of each segment within each electronic communication, and determining an interaction between the one or more customers and agents within each electronic communication;
  identifying a pattern in each recorded electronic communication based on the linguistic analysis and the non-linguistic analysis over the first predetermined time period;
  determining a frequency for the pattern in each recorded electronic communication over the first predetermined time period;
  identifying a first subset of communications from the plurality of recorded electronic communications that are relevant based on the identified pattern and the determined frequency for the pattern over the first predetermined time period;
  identifying a second subset of communications that exhibit distress from the first subset of communications;
  identifying a trend in the second subset of communications over the first predetermined time period based on the determined frequency for the pattern and presence of distress;
  displaying the identified trend on a graphical user interface; and
  transmitting the second subset of communications to relevant personnel of the organization, the second subset of communications being the most relevant communications relative to the plurality of electronic communications.

15. The computer-implemented method of claim 14, which further comprises:
  identifying a pattern in each recorded electronic communication that occurs over a second predetermined time period;
  determining a frequency for the pattern in each recorded electronic communication over the second predetermined time period;
  identifying a subset of communications from the plurality of electronic communications that are relevant based on the identified pattern and the determined frequency over the second predetermined time period; and
  identifying a trend in the subset of communications over the second predetermined time period.

16. The computer-implemented method of claim 15, wherein the first and second predetermined time periods are sequential and do not overlap.

17. The computer-implemented method of claim 15, which further comprises generating a recommended action based on a comparison of a first plurality of identified patterns from the first predetermined time period to a second plurality of identified patterns from the second predetermined time period.

18. The computer-implemented method of claim 17, which further comprises transmitting the recommended action to a communication distributor.

19. The computer-implemented method of claim 14, wherein identifying the pattern comprises establishing a frequency threshold, and including a pattern that exceeds the frequency threshold in the identified pattern.

20. The computer-implemented method of claim 14, which further comprises sending an automated message to an external source based on the identified trend.

21. A non-transitory machine-readable medium comprising a plurality of machine-readable instructions which, when executed by one or more processors, are adapted to cause the one or more processors to perform a method which comprises:
  recording a plurality of electronic communications between one or more customers of an organization and a contact center having one or more agents;
  applying linguistic analysis to each recorded electronic communication that occurs over a first predetermined time period to identify segments including words related to business or nonbusiness categories within each electronic communication;
  applying non-linguistic analysis to each electronic communication that occurs over the first predetermined time period, wherein the non-linguistic analysis includes at least one of timing of each segment of each electronic communication, determining a position of each segment within each electronic communication, determining a quantity of each segment within each electronic communication, and determining an interaction between the one or more customers and agents within each electronic communication;
  identifying a pattern in each recorded electronic communication based on the linguistic analysis and the non-linguistic analysis over the first predetermined time period;
  determining a frequency for the pattern in each recorded electronic communication over the first predetermined time period;
  identifying a first subset of communications from the plurality of recorded electronic communications that are relevant based on the identified pattern and the determined frequency for the pattern over the first predetermined time period;
  identifying a second subset of communications that exhibit distress from the first subset of communications;
  identifying a trend in the second subset of communications over the first predetermined time period based on the determined frequency for the pattern;
  generating a recommended action based on the identified trend;
  displaying the recommended action to a user; and
  transmitting the second subset of communications to relevant personnel of the organization, the second subset of communications being the most relevant communications relative to the plurality of electronic communications.

22. The non-transitory machine-readable medium of claim 21, wherein the method further comprises:
  identifying a pattern in each recorded electronic communications that occurs over a second predetermined time period;

determining a frequency for the pattern in each recorded electronic communication over the second predetermined time period;

identifying a subset of communications from the plurality of recorded electronic communications that are relevant based on the identified pattern and the determined frequency over the second predetermined time period; and identifying a trend in the subset of communications over the second predetermined time period.

23. The non-transitory machine-readable medium of claim 22, wherein the first and second predetermined time periods are sequential and do not overlap.

24. The non-transitory machine-readable medium of claim 22, wherein generating the recommended action is based on a comparison of a first plurality of identified patterns from the first predetermined time period to a second plurality of identified patterns from the second predetermined time period.

25. The non-transitory machine-readable medium of claim 21, wherein identifying the pattern further comprises establishing a frequency threshold, and including a pattern that exceeds the frequency threshold in the identified pattern.

26. The non-transitory machine-readable medium of claim 21, wherein the method further comprises sending an automated message to an external source based on the identified trend.

* * * * *